US012592645B2

(12) United States Patent
Barry

(10) Patent No.: US 12,592,645 B2
(45) Date of Patent: Mar. 31, 2026

(54) SWITCHED-IN VOLTAGE DOUBLER UTILIZING PARALLEL/SERIES RECTIFIER OUTPUT

(71) Applicant: Advanced Energy Industries, Inc., Denver, CO (US)

(72) Inventor: Brendan Barry, Cork (IE)

(73) Assignee: Advanced Energy Industries, Inc., Denver, CO (US)

( * ) Notice: Subject to any disclaimer, the term of this patent is extended or adjusted under 35 U.S.C. 154(b) by 251 days.

(21) Appl. No.: 18/618,373

(22) Filed: Mar. 27, 2024

(65) Prior Publication Data

US 2025/0309772 A1     Oct. 2, 2025

(51) Int. Cl.
H02M 1/088 (2006.01)
H02M 3/335 (2006.01)

(52) U.S. Cl.
CPC ....... H02M 3/33569 (2013.01); H02M 1/088 (2013.01)

(58) Field of Classification Search
CPC .......................... H02M 3/33569; H02M 1/088
See application file for complete search history.

(56) References Cited

U.S. PATENT DOCUMENTS 3,900,788 A      8/1975   Behn et al.
5,375,053 A    12/1994   Jarvik et al.

5,717,293 A      2/1998   Sellers
7,305,065 B2   12/2007   Takahashi et al.
10,411,611 B2 *  9/2019   Perchlik .................. H02M 1/08
2007/0047275 A1   3/2007   Hesterman et al.
2020/0106366 A1 *  4/2020   Miletic ................... H02M 3/01
2023/0109823 A1   4/2023   Hung
2024/0072673 A1   2/2024   Sigamani
2024/0195312 A1 *  6/2024   Huang .............. H02M 3/33592

OTHER PUBLICATIONS

Author Unknown; Full Wave Voltage Doubler, Tripler, and Quadrupler;Jan. 1, 2024; Augustica Industries.
Ching-Shan Leu and Pin-Yu Huang, A Novel Voltage Doubler Rectifier for High Output Voltage Applications; Jul. 2010; 2010 International Power Electronics Conference.
PCT, International Search Report and Written Opinion issued in PCT/US2025/021079 on May 22, 2025, 19 pages.

* cited by examiner

*Primary Examiner* — Adolf D Berhane
(74) *Attorney, Agent, or Firm* — NOD Law PC

(57) ABSTRACT

This disclosure describes systems, methods, and apparatuses for a power supply, the power supply configured for monitoring a voltage at an output end of the power supply; controlling, based on the voltage exceeding a first threshold, a first switch to connect a plurality of secondary windings of the power supply in series; and controlling, based on the voltage exceeding a second threshold, at least one other switch to switch in at least one capacitor into the power supply, wherein the second threshold is greater than the first threshold.

20 Claims, 13 Drawing Sheets

800

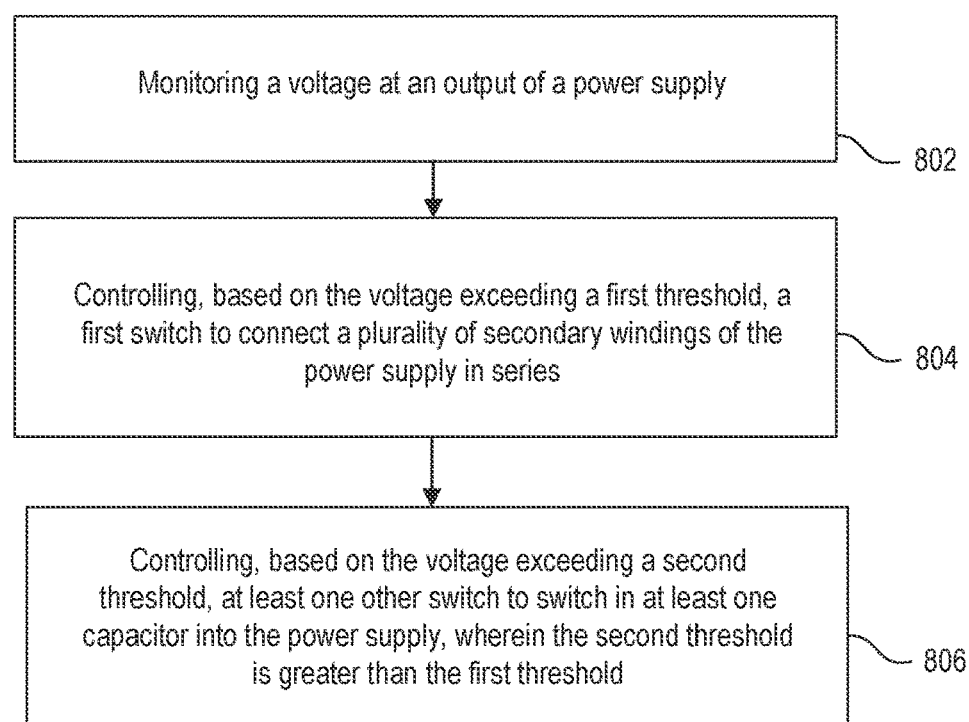

Monitoring a voltage at an output of a power supply

802

Controlling, based on the voltage exceeding a first threshold, a first switch to connect a plurality of secondary windings of the power supply in series

804

Controlling, based on the voltage exceeding a second threshold, at least one other switch to switch in at least one capacitor into the power supply, wherein the second threshold is greater than the first threshold

SWITCHED-IN VOLTAGE DOUBLER UTILIZING PARALLEL/SERIES RECTIFIER OUTPUT

FIELD OF THE DISCLOSURE

The present disclosure relates generally to power supplies. Specifically, but without limitation, the present disclosure relates to systems, methods, and apparatuses for power supplies employing a voltage doubler.

DESCRIPTION OF RELATED ART

Some power supplies, such as, but not limited to, switch-mode power supplies (SMPS') are employed to efficiently transform voltage and current from one form to another (e.g., Alternating Current (AC) to Direct Current (DC), DC to AC, or DC-DC). In some cases, SMPS' may utilize energy storage elements (e.g., capacitors and/or inductors) to store energy during one part of a high-frequency switching cycle, and release said energy during another part of the high-frequency switching cycle. In some cases, such power supplies can also be referred to as "capacitor chargers" as they can be employed to charge one or capacitors coupled at the output of the power supply. Furthermore, the capacitor(s) charged using such capacitor chargers can be subsequently discharged to release a large amount of energy in a short duration, which can be used to power lasers (e.g., in medical applications, such as tattoos or hair removal).

In some cases, an SMPS (e.g., capacitor charger) may be utilized to supply the required voltage and current to a bank of 'large' capacitors. These capacitors may be electrically connected to a laser via one or more semiconductor switches, such as, but not limited to, a Metal-oxide Semiconductor Field Effect Transistor (MOSFET) or Insulated-gate Bipolar Transistor (IGBT). This allows the laser to generate a powerful pulse of light (i.e., a high-energy laser beam), which can then be focused on a target area (e.g., a patch of hair for hair removal, a tattoo for tattoo removal, to name two non-limiting examples).

Ideally, capacitor chargers should be designed to charge the output capacitors within a reasonable amount of time and in a consistent manner (e.g., minimal to no overshoots). In some circumstances, adequate design of capacitor chargers can prove to be difficult. Furthermore, power supplies or capacitor chargers often need significant redesign to achieve an adequate charge profile at higher voltages. Additionally, or alternatively, significantly longer charging times may be required to charge the load capacitor to higher voltages due to the drop in the amount of current delivered to the load capacitor at higher voltages.

Thus, currently used techniques utilized in certain power supplies, such as those employing a capacitor charger, are lacking in several regards. Hence, there is a need for a refined method and system for providing an adequate charging profile for power supplies (e.g., capacitor chargers) at higher voltages that can help enhance power supply performance, as well as reduce complexity and/or costs, as compared to the prior art.

The description provided in the description of related art section should not be assumed to be prior art merely because it is mentioned in or associated with this section. The description of related art section may include information that describes one or more aspects of the subject technology.

SUMMARY OF THE DISCLOSURE

The following presents a simplified summary relating to one or more aspects and/or embodiments disclosed herein.

As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some aspects, the techniques described herein relate to a method of operating a power supply including: monitoring a voltage at an output end of the power supply; controlling, based on the voltage exceeding a first threshold, a first switch to connect a plurality of secondary windings of the power supply in series; and controlling, based on the voltage exceeding a second threshold, at least one other switch to switch in at least one capacitor into the power supply, wherein the second threshold is greater than the first threshold.

In some aspects, the techniques described herein relate to a method, wherein the power supply includes a transformer coupled between an input end and the output end of the power supply, the transformer including a single primary winding and the plurality of secondary windings.

In some aspects, the techniques described herein relate to a method, wherein, when the voltage is at or below the first threshold, the first switch is turned OFF; and the plurality of secondary windings are connected in parallel.

In some aspects, the techniques described herein relate to a method, wherein controlling the at least one other switch includes: turning ON a second switch to switch in a capacitor connected in series with the second switch into the power supply, and wherein the second switch and the capacitor are coupled between a first secondary winding and a second secondary winding of the plurality of windings.

In some aspects, the techniques described herein relate to a method, wherein controlling the at least one other switch includes: turning ON a second switch connected to a first secondary winding of the plurality of secondary windings, and wherein turning ON the second switch switches in a first capacitor connected in series with the second switch into the power supply; and turning ON a third switch connected to a second secondary winding of the plurality of secondary windings, and wherein turning ON the third switch switches in a second capacitor connected in series with the third switch into the power supply.

In some aspects, the techniques described herein relate to a method, wherein the second switch and third switch are turned ON at a same or approximately the same time.

In some aspects, the techniques described herein relate to a method, wherein: the second threshold is twice the first threshold.

In some aspects, the techniques described herein relate to a method, wherein controlling the first switch and the at least one other switch enables the power supply to supply a constant or substantially constant output power when the voltage is in a range from 0V to at least twice the second threshold.

In some aspects, the techniques described herein relate to a method, wherein controlling the first switch and the at least one other switch enables the power supply to supply, for a range of voltages, a constant or substantially constant output power to a load connected at the output end of the power supply, and wherein a lower end of the range is below the first threshold and an upper end of the range is greater than the second threshold.

In some aspects, the techniques described herein relate to a power supply including: a transformer circuit connected between an input end and an output end of the power supply, wherein the transformer circuit includes: a primary winding; a plurality of secondary windings, including at least a first secondary winding and a second secondary winding; a first switch; at least one other switch, each of the at least one other switch connected in series with a capacitor; and a monitoring circuit, wherein the monitoring circuit is configured to: monitor a voltage at an output end of the power supply; control, based on the voltage exceeding a first threshold, the first switch to connect at least the first and the second secondary windings in series; and control, based on the voltage exceeding a second threshold, the at least one other switch to switch in a respective capacitor into the power supply, wherein the second threshold is greater than the first threshold.

In some aspects, the techniques described herein relate to a power supply, wherein the plurality of secondary windings, including at least the first secondary winding and the second secondary winding are connected in parallel when the voltage is at or below the first threshold.

In some aspects, the techniques described herein relate to a power supply, wherein controlling the at least one other switch includes: controlling a second switch coupled between the first and the second secondary windings, and wherein controlling the second switch switches in a capacitor connected in series with the second switch into the power supply.

In some aspects, the techniques described herein relate to a power supply, wherein controlling the at least one other switch includes: controlling a second switch connected to the first secondary winding to switch in a first capacitor connected in series with the second switch into the power supply; and controlling a third switch connected to the second secondary winding to switch in a second capacitor connected in series with the third switch into the power supply.

In some aspects, the techniques described herein relate to a power supply, wherein the second switch and third switch are switched ON at a same or approximately the same time.

In some aspects, the techniques described herein relate to a power supply, further including: a first rectifier circuit connected to the first secondary winding; and a second rectifier circuit connected to the second secondary winding; and wherein the first switch is coupled between the first and the second rectifier circuits.

In some aspects, the techniques described herein relate to a power supply, wherein: the second threshold is at least twice the first threshold.

In some aspects, the techniques described herein relate to a power supply, wherein controlling the first switch and the at least one other switch enables the power supply to supply a constant or substantially constant output power when the voltage is in a range from 0V to at least twice the second threshold.

In some aspects, the techniques described herein relate to a power supply, wherein controlling the first switch and the at least one other switch enables the power supply to supply, for a range of voltages, a constant or substantially constant output power to a load connected at the output end of the power supply, and wherein a lower end of the range is below the first threshold and an upper end of the range is greater than the second threshold.

In some aspects, the techniques described herein relate to a power supply, wherein the power supply is configured to receive, at the input end, input power from one of a direct current (DC) power source or an alternating current (AC) power source, and wherein the power supply is configured to supply AC power to the primary winding of the transformer circuit.

In some aspects, the techniques described herein relate to a non-transitory computer readable storage medium storing processor readable instructions that, when executed by a processor, cause the processor to perform a method for operating a power supply, the method including: monitoring a voltage at an output end of the power supply; controlling, based on the voltage exceeding a first threshold, a first switch to connect a plurality of secondary windings of the power supply in series; and controlling, based on the voltage exceeding a second threshold, at least one other switch to switch in at least one capacitor into the power supply, wherein the second threshold is greater than the first threshold.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 8 illustrates an example of a method for operating a power supply, according to various aspects of the present disclosure.

DETAILED DESCRIPTION

Figure 1A:
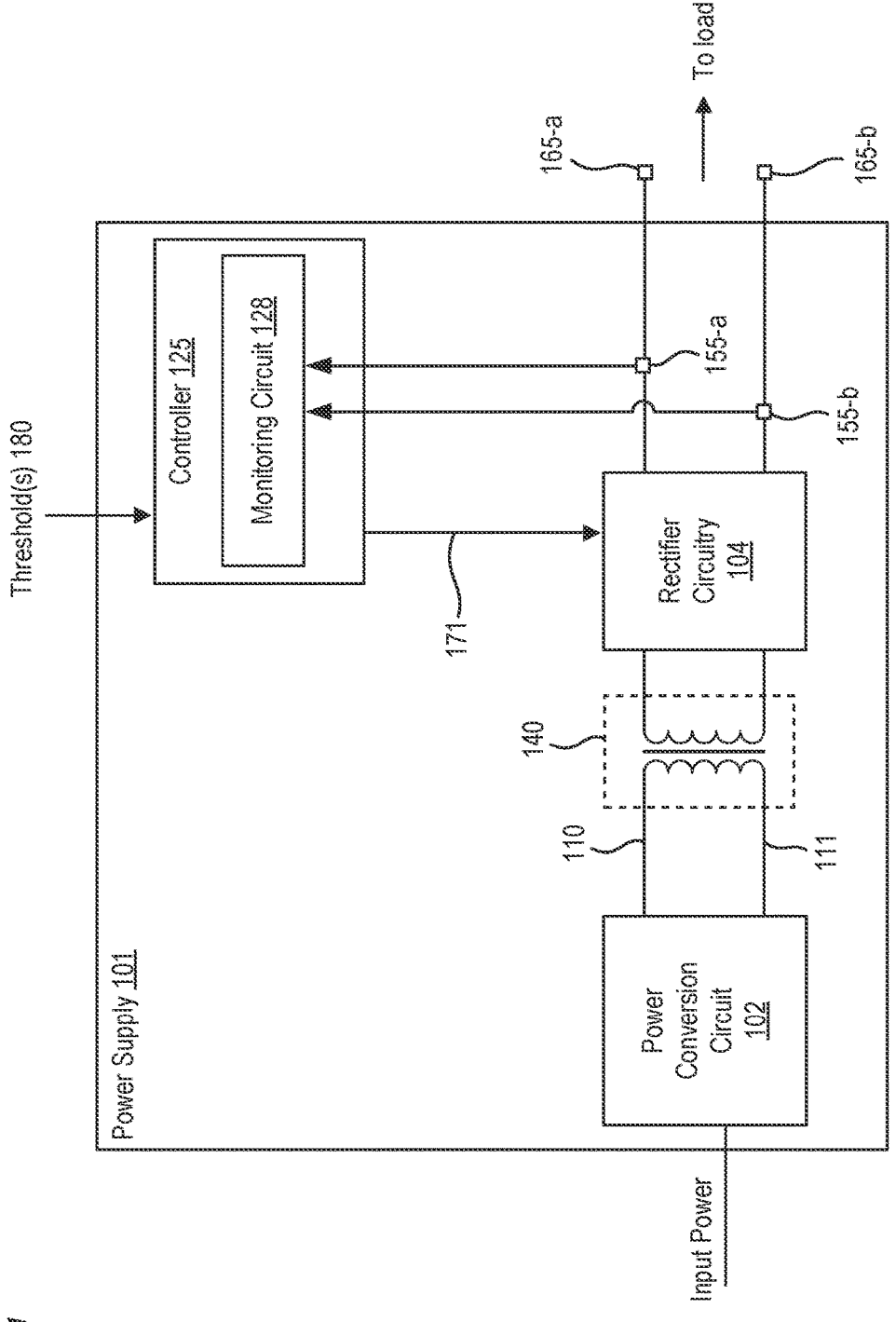
FIG. 1A illustrates an example of a power system that can be configured for charging a load capacitor, according to various aspects of the present disclosure.

Prior to describing the embodiments in detail, it is expedient to define certain terms as used in this disclosure.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods, and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Some commercially available power supplies, such as capacitor chargers, comprise a transformer having a single primary winding and one or more or more secondary windings, where the one or more secondary windings are connected to, or coupled across, a load capacitor. In essence, the power supply is configured to receive an input power (e.g., AC mains power, DC power), convert it to an AC power having a desired frequency, and supply the AC waveform to a primary winding of a transformer. The transformer includes at least one secondary winding, and the turns ratio of the primary to secondary winding(s) dictates the amplitude of the voltage on the secondary side of the transformer. For example, a higher turns ratio between the secondary winding and the primary winding can result in a higher output voltage on the secondary or output side of the power supply. In some instances, each secondary winding can be coupled to a rectifier circuit for converting the AC waveform to a DC waveform, where the DC waveform can be used to charge the load capacitor (e.g., $C_{load}$ 399 in FIG. 3A; $C_{pulse}$ in FIG. 5).

In some other cases, two or more secondary windings may be utilized for added flexibility (e.g., a substantially constant output power across a wide range of output voltages, reducing charging time, to name a few). In such cases, a two-stage output rectifier scheme may be implemented in the power supply, wherein each of the secondary windings can be coupled to a different rectifier circuit (e.g., secondary winding 244-*a* is coupled to rectifier circuit 214-*a* and secondary winding 244-*b* is coupled to rectifier circuit 214-*b* in FIG. 2). In some examples, the secondary windings may be connected in parallel, for instance, when the output or load voltage is below a threshold (e.g., <100 V, <300V, <500 V, to name a few). Additionally, when the output or load voltage is at or above the threshold, a switch may be turned ON (or closed) to couple the secondary windings in series, further described below in relation to FIGS. 1B and/or 1C. While such a design allows the use of a wider range of charging voltages for charging capacitors having different capacitances (e.g., ranging from 50 microfarads up to 100s of farads), a major design of the windings (i.e., windings on the primary and/or secondary side of the power supply), rectifier circuit, and/or switch may be needed to provide a constant or substantially constant power when a higher output voltage, shorter charging times, etc., may be desired.

For instance, a prior art system (e.g., as described in FIGS. 1B and/or 1C) may toggle a switch (e.g., switch 116) to cause the secondary windings and/or rectifier circuits to connected in series, so as to increase the volage range over which a substantially constant output power can be provided to the load capacitor. While such a design enhances the charging profile, i.e., as compared to an instance where the same or similar power supply is utilized but without the series switch (e.g., switch 116 in FIG. 1B), achieving higher and higher voltages can be problematic without: significant redesign of the power supply and its internal components and/or added complexity and costs, including replacement costs of one or more components (e.g., switches, diodes, etc.) to handle larger currents/voltages/power.

Recognizing this, aspects of the present disclosure are designed to address one or more of the above issues by providing a power system that can enhance the charging profile, as compared to the prior art, by switching at least one capacitor into the power supply when the output/load voltage exceeds a second threshold, where the second threshold corresponds to a higher voltage than the one achievable when the secondary windings/rectifiers are reconfigured from a parallel to a series arrangement. Such a design enables the power supply (or capacitor charger) to provide a constant or substantially constant output power over a wider range of voltages, than those achievable by prior art systems. Additionally, or alternatively, some aspects of the present disclosure can help provide a compact power system that may be capable of providing a substantially constant or increased output power over a wider rate of voltages while ensuring: (1) minimal to no changes to the primary and/or secondary windings of the transformer, and/or (2) maintaining or reducing manufacturings costs by reducing the number of components (e.g., diodes, switches, wiring or cables, etc.) that need to be replaced due to the increased voltage/power capabilities.

FIG. 1A illustrates an example of a power system 100-*a* configured for charging a capacitive load, according to various aspects of the disclosure. As seen in FIG. 1A, the power system 100-*a* comprises a power supply 101 having a power conversion circuit 102 and a transformer 140 having at least one primary winding (e.g., shown as primary winding 243 in FIG. 2) and at least one secondary winding (e.g., shown as a first secondary winding 244-*a*, a second secondary winding 244-*b* in FIG. 2). The power conversion circuit 102 is connected to the primary winding of the transformer 140 using a first power/voltage rail 110 and a second power/voltage rail 111. As shown, the power supply 101 further comprises rectifier circuitry 104 coupled to the secondary winding(s) of the transformer 140 and a controller 125 having a monitoring circuit 128. FIG. 1A also shows output nodes 155-*a*, 155-*b* of the power supply 101, where each of the output nodes 155 is configured to couple or connect to one of the input nodes 165 (e.g., input node 165-*a*, input node 165-*b*) of the load circuit. In some examples, the capacitive load (or load capacitor) of the load circuit may be coupled across the input nodes 165-*a*, 165-*b* of the load circuit.

The monitoring circuit 128 may be configured to monitor a potential difference or voltage between nodes 155-*a* and 155-*b*, for instance, by measuring a voltage at each of nodes 155-*a* and 155-*b* and calculating the output voltage (e.g., potential difference between the nodes 155-*a* and 155-*b*). In some examples, at least one of the nodes (e.g., node 155-*b*) may be at a reference or ground voltage. In some cases, the controller 125 is further configured to receive an indication of one or more threshold(s) 180, such as, but not limited to, a first voltage threshold (e.g., 100V, 500 V, etc.) and a second threshold (e.g., second voltage threshold 200V, 1000V, etc.), where the second voltage threshold may be greater than the first voltage threshold. The controller 125 may compare the measured voltage to the threshold(s) 180 and output at least one control signal 171 to control one or more switches in the rectifier circuitry 104, further described below. In some examples, the at least one control signal 171 may be used to close or turn ON a first switch (e.g., a series switch) when the measured output voltage is above the first threshold. Furthermore, the at least one control signal 171 can be used to close to turn ON a second, different switch (e.g., a doubler switch) when the measured output voltage is above the second threshold. Additional details on monitoring the output voltage and controlling the plurality of switches of the power supply are described with reference to the figures below, including at least FIGS. 2-4.

Figure 1B:
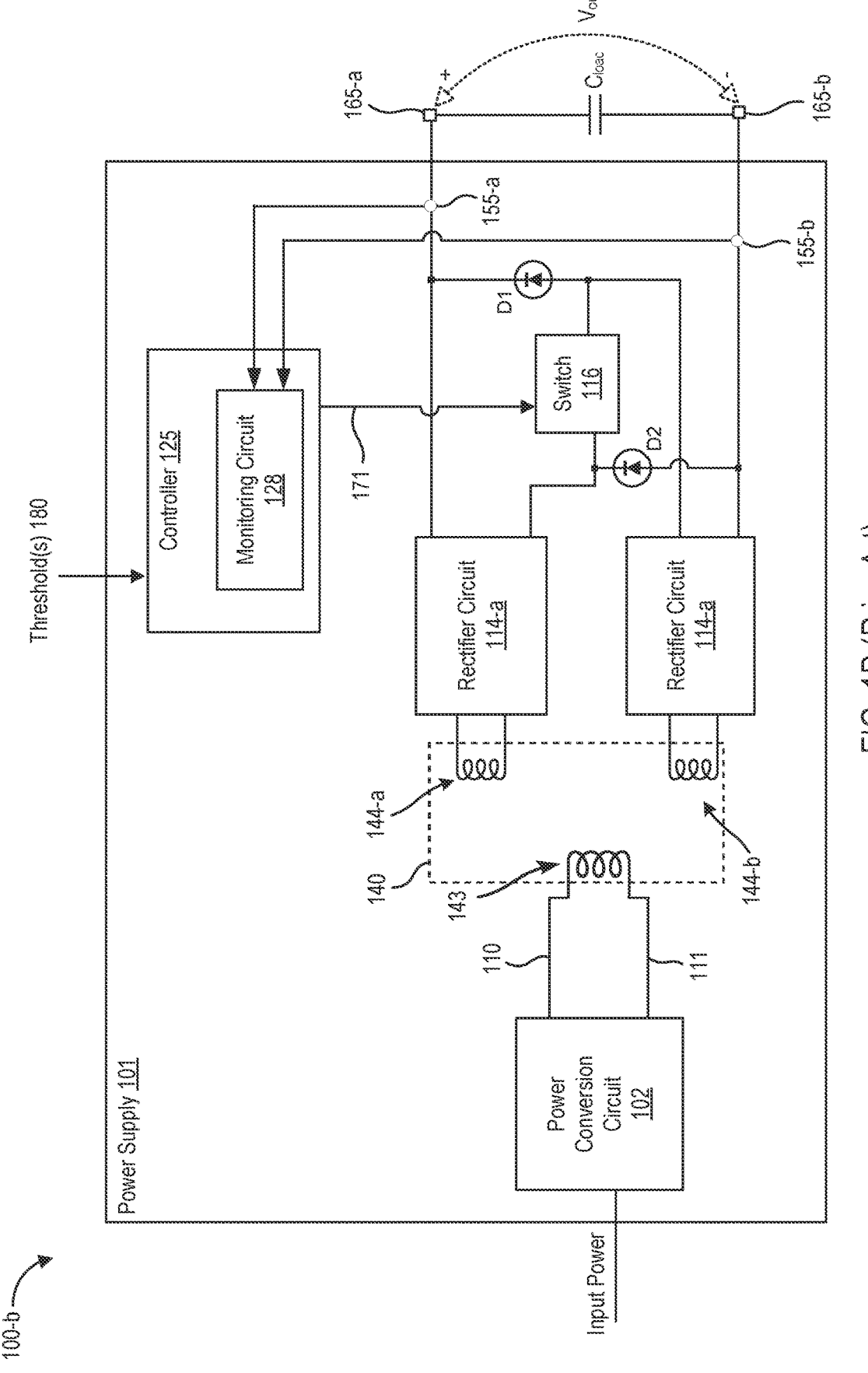
FIG. 1B illustrates an example of a prior art power system configured for charging a load capacitor, where the power system utilizes a two-stage output rectifier scheme, in accordance with one or more implementations.

FIG. 1B illustrates an example of a prior art power system 100-*b* configured for charging a load capacitor, where the power system 100-*b* utilizes a two-stage output rectifier scheme, in accordance with one or more implementations. As seen in FIG. 1B, the power system 100-*b* comprises a power supply 101 having a power conversion circuit 102 and a transformer 140 having a primary winding 143 and a plurality of secondary windings (e.g., a first secondary winding 144-*a*, a second secondary winding 144-*b*). The power conversion circuit 102 is connected to the primary winding 143 of the transformer 140 using a first power/voltage rail 110 and a second power/voltage rail 111. As shown, the power supply further comprises the plurality of secondary windings 144-*a*, 144-*b*, a switch 116 (e.g., MOS-FET, or another applicable semiconductor switch), and output nodes 155-*a* and 155-*b*. Each of the secondary windings may be coupled to a rectifier circuit 114, as shown in FIG. 1B.

In some examples, the power supply 101 further includes a controller 125, where the controller 125 includes a monitoring circuit 128. The monitoring circuit 128 may be configured to monitor a potential difference or voltage between nodes 155-*a* and 155-*b*, for instance, by measuring a voltage at each of nodes 155-*a* and 155-*b* and calculating the difference between the measured voltages. In some examples, at least one of the nodes (e.g., node 155-*b*) may be at a reference or ground voltage. In some cases, the controller 125 is further configured to receive an indication of one or more threshold(s) 180, such as, but not limited to, a voltage threshold (e.g., 100V, 200V, 250V, 500 V, etc). The controller 125 may compare the measured voltage to the threshold(s) 180 and output a control signal 171 to control the switch 116. For example, the control signal 171 may be used to open or turn OFF the switch 116 when the measured voltage is below the threshold, in which case the secondary windings 144-*a* and 144-*b* (or alternatively, the secondary winding and respective rectifier circuit combination, such as secondary winding 144-*a* and rectifier circuit 114-*a* combination, secondary winding 144-*b* and rectifier circuit 114-*b* combination) may be connected in parallel. This serves to provide a higher charging current for a lower output voltage. Conversely, as the monitoring circuit 128 detects an increase in the output voltage, the control signal 171 can close or turn ON the switch 116, for instance, when the measured voltage ($V_{out}$) is at or above the threshold 180. In this way, controlling the switch 116 enables the secondary windings 144 and rectifier circuits 114 to be connected in parallel (e.g., when the measured voltage $V_{out}$ is below the threshold voltage) or in series (e.g., when the measured voltage $V_{out}$ is above the threshold voltage).

In some cases, at lower voltages (e.g., output voltages below a threshold, such as <500 V), the secondary windings 144 of the transformer may be connected in parallel, which allows a higher charging current to be provided to charge the one or more output capacitors. Additionally, at higher voltages (e.g., output voltage is above the threshold, such as >500 V), the secondary windings 144 of the transformer may be connected in series through the two rectifier circuits. It should be noted that, even though the charging current is halved, the output power (e.g., from 500V to 1 kV) of the power supply when the secondary windings are connected in series may be equal or substantially equal to the output power (e.g., from 250V to 500V) of the power supply when the secondary windings are connected in parallel due to the increase in output voltage capability.

Figure 1C:
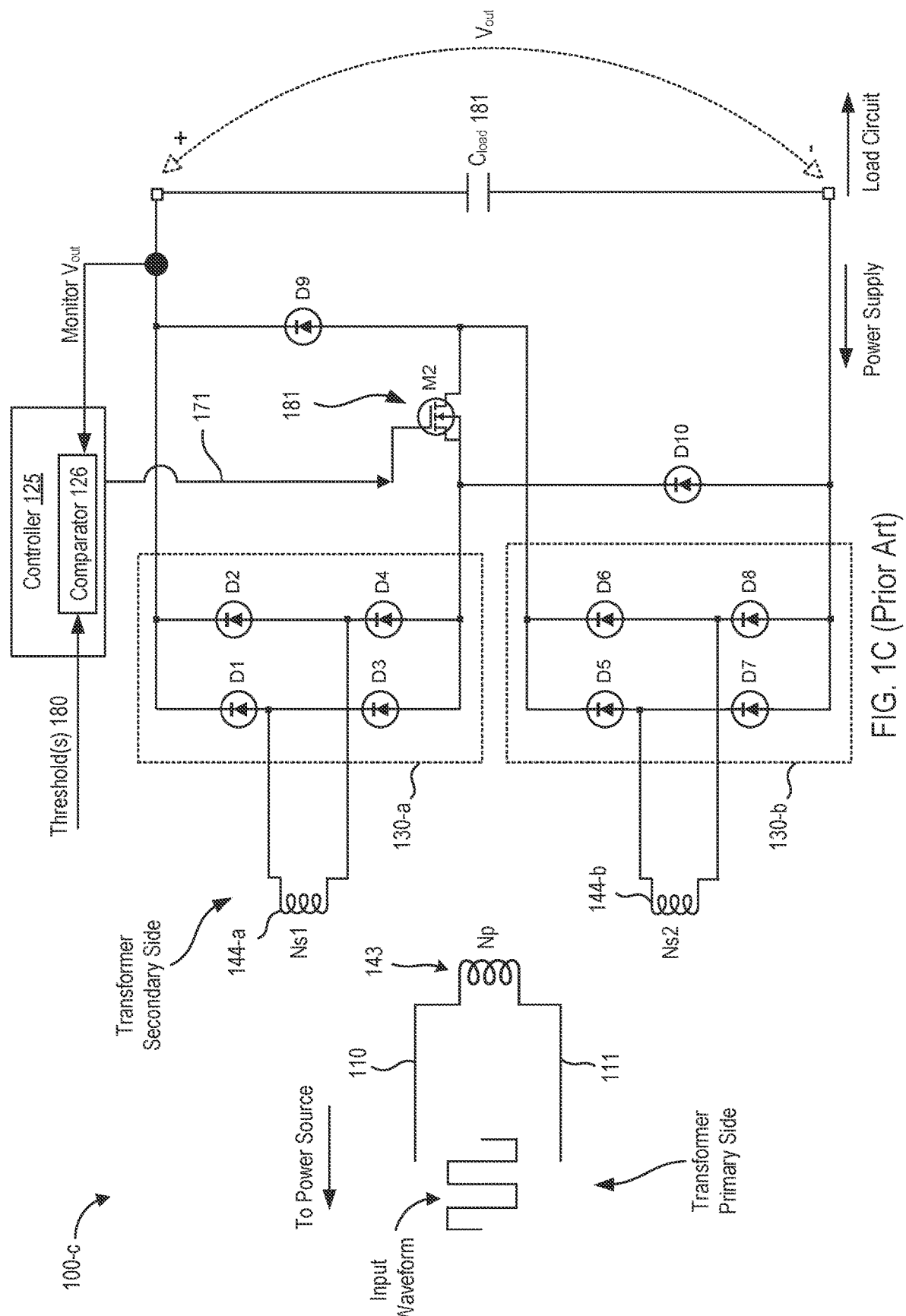
FIG. 1C illustrates a detailed schematic diagram of the power system in FIG. 1B, in accordance with one or more implementations.

Turning now to FIG. 1C, which illustrates a detailed schematic diagram 100-*c* of the power system in FIG. 1B, in accordance with one or more implementations. As seen, the power system (100-*c*) comprises the transformer having a primary side and a secondary side, where the transformer primary side includes a primary winding 143 (Np) coupled between two power/voltage rails 110 and 111. Additionally, the transformer secondary side includes a plurality of secondary windings 144-*a* (Ns1) and 144-*b* (Ns2). As seen in FIG. 1C, each of the secondary windings of the transformer can be coupled to a different rectifier circuit. For example, the first secondary winding 144-*a* (Ns1) of the transformer can be coupled to a first rectifier circuit 130-*a* and the second secondary winding (Ns2) of the transformer can be coupled to a second rectifier circuit 130-b. Here, the rectifier circuit(s) 130-a and 130-b comprise full-bridge rectifier circuits, where rectifier circuit 130-a includes diodes D1, D2, D3, and D4 arranged in a full-bridge configuration and rectifier circuit 130-b includes diodes D5, D6, D7, and D8 arranged in a full-bridge configuration.

As described above in relation to FIG. 1B, the power supply can further include a series switch, e.g., shown as switch 181 (or M2) in FIG. 1C, that can be controlled (e.g., using the controller 125 and comparator 126) based on monitoring the output voltage ($V_{out}$) at the load capacitor ($C_{load}$ 181). For example, the controller 125 can output a control signal 171 to close the switch 181 (M2) when $V_{out}$ is above a threshold 180 (e.g., 100V, 250V, 500V, to name a few non-limiting examples), or alternatively, open the switch M2 when $V_{out}$ is below the threshold.

In some cases, when the series switch M2 is open, the secondary windings 144-a, 144-b and output bridge rectifiers are set to be in parallel. In such cases, the upper secondary winding 144-a (or Ns1) provides current to the load capacitor 181 ($C_{load}$) through the rectifier diodes D1, D2. Additionally, the return current flows through the lower parallel diode (D10) and the rectifier diodes D3 and D4. Similarly, the lower secondary winding 144-b (Ns2) of the transformer uses the rectifier diodes (D5, D6, D7, and D8) of the rectifier circuit 130-b and the upper parallel diode (D9) to provide the load current and return current.

In some instances, when the series switch 181 (also shown as switch 116 in FIG. 1B) is closed, the secondary windings 144-a (or Ns1) and 144-b (or Ns2) and output rectifiers are connected in series. In such cases, the current flows through the series switch 181 instead of the upper diode D9 and/or lower diode (D10). This causes the secondary windings 144 of the transformer to be connected in series, which enhances (e.g., doubles) the output voltage capability due to the increase in the transformer winding ratio. It should be noted that the secondary windings 144-a, 144-b of the transformer may have the same or a different number of windings. For example, the secondary winding 144-a and the secondary winding 144-b may each have 4 or 8 windings, while the primary winding 143 (Np) may have 2 windings. Alternatively, the secondary winding 144-a may have 50 windings, the secondary winding 144-b may have 100 windings, while the primary winding 143 may have 25 windings. Other numbers of windings, turns ratios, etc., are contemplated in different embodiments, and the examples listed herein are exemplary only and not intended to limit the scope and/or spirit of the disclosure.

In some circumstances, the output voltage capability of the power supply 100-c may be limited by the turns ratio of the isolation transformer. Additionally, any attempts to pull current at a higher voltage than that dictated by the maximum output voltage causes the output power to drop to zero, as shown in FIG. 6A.

Figure 6A:
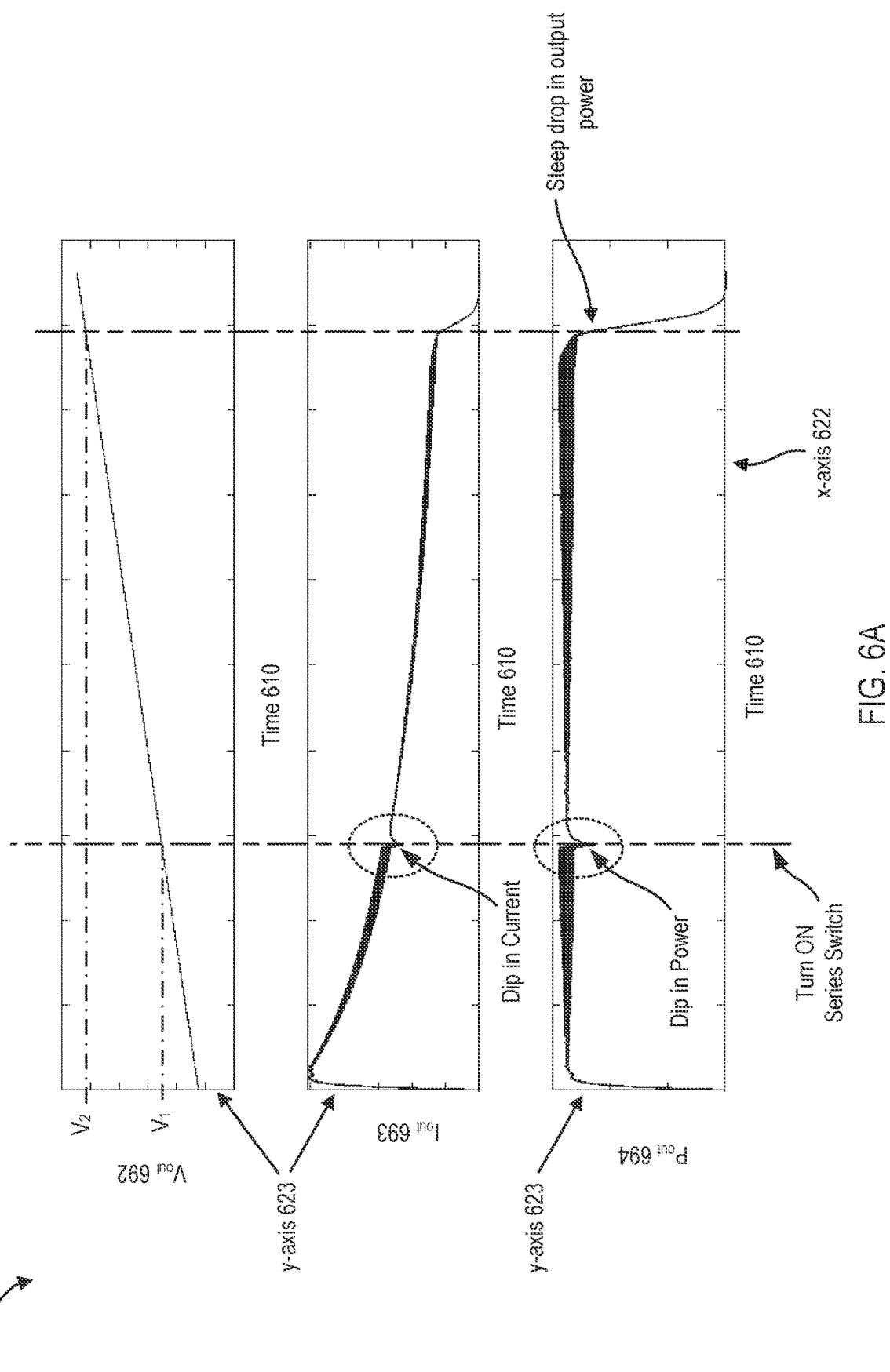
FIG. 6A illustrates conceptual graphs showing a charging profile for a load capacitor charged using a prior art capacitor charger.

FIG. 6A illustrates a conceptual graph 600-a showing output voltage ($V_{out}$) 692, output current ($I_{out}$) 693, and output power ($P_{out}$) 694 on y-axis 623 and time 610 on x-axis 622 for a prior art power system, such as power system(s) 100-b and/or 100-c described herein. As seen in FIG. 6A, there is a temporary drop (or dip) in the power output when the series switch (e.g., switch M2 in FIG. 1C) is turned ON. In some cases, the series switch may be turned ON to connect the two secondary windings of the transformer in series, for instance, based on detecting that the monitored $V_{out}$ exceeds a first threshold voltage ($V_1$).

In some cases, the maximum output voltage ($V_2$) capability of the power supply or capacitor charger may be limited by the turns ratio of the isolation transformer. Furthermore, any attempt to pull current at a higher voltage than $V_2$ causes $P_{out}$ to drop to zero. As seen in FIG. 6A, there is a steep drop in the output power ($P_{out}$) when $V_{out}$ is at or above $V_2$. In one non-limiting example, $V_1$ may be about 500 V and $V_2$ may be equal or approximately equal to 1 kV. In another example, $V_1$ may be around 100V, and $V_2$ may be around 200V. It should be noted that the voltage threshold values, maximum voltage values, output power values, etc., described herein are exemplary only and not intended to limit the scope and/or spirit of the present disclosure.

Figure 2:
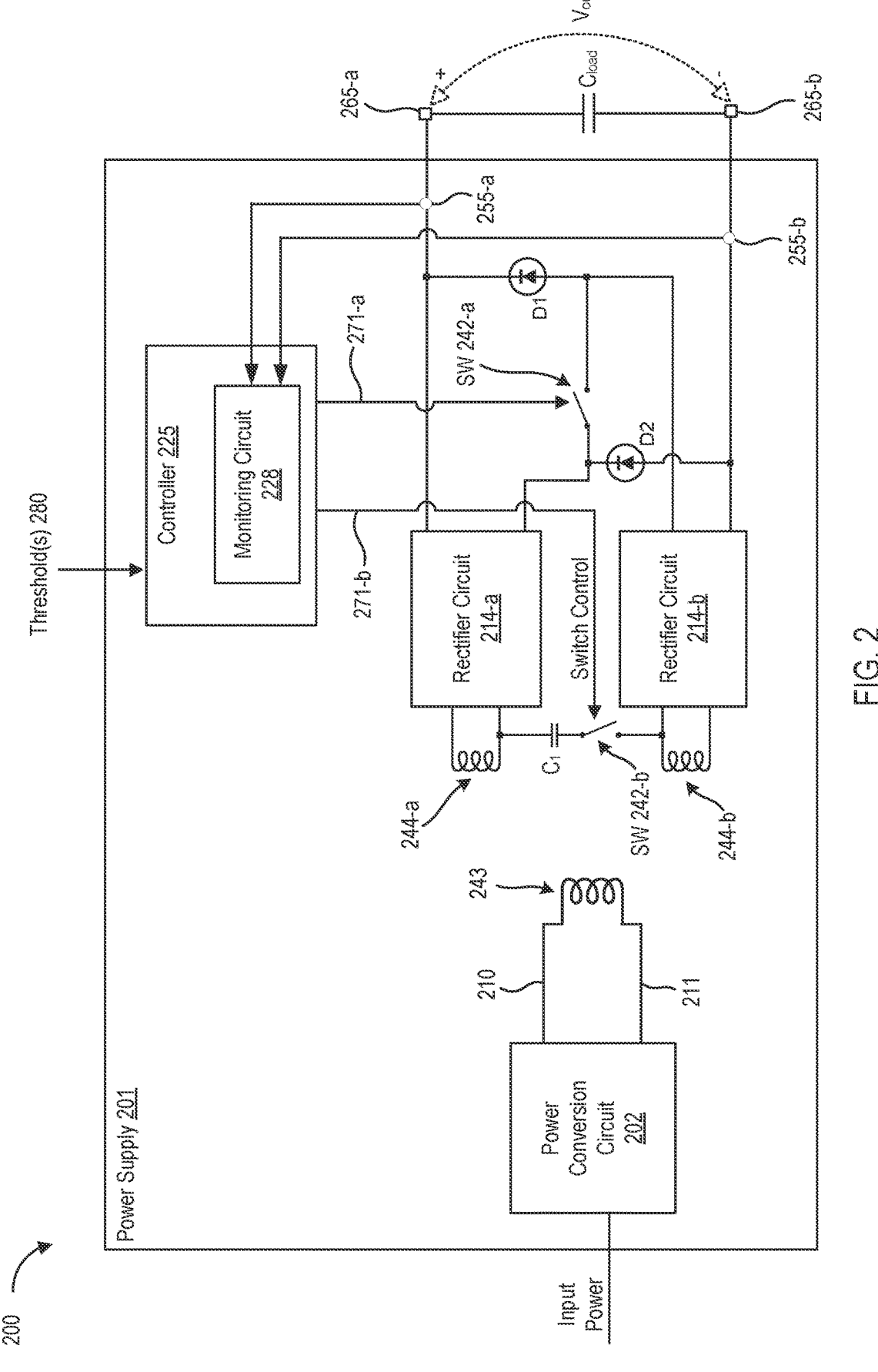
FIG. 2 illustrates an example of a power system that can be configured for charging a load capacitor, where the power system includes a plurality of secondary windings and a capacitor between the secondary windings that can be switched in/out of the power supply based on the monitored output voltage, according to various aspects of the present disclosure.

Turning now to FIG. 2, which illustrates an example of a power system 200 that can be configured for charging a load capacitor ($C_{load}$), according to various aspects of the present disclosure. In this example, the power system 200 includes a plurality of secondary windings 244 and a capacitor ($C_1$) that can be switched in or out of the power supply 201 based on the monitored output voltage ($V_{out}$) across the nodes 265-a and 265-b, i.e., the $V_{out}$ across the load capacitor $C_{load}$. In some embodiments, the power system 200 implements one or more aspects of the power system(s) 100-a, 100-b, and/or 100-c, or any of the other power systems described herein. However, unlike the power system(s) described in relation to FIGS. 1B and/or 1C, the power system 200 utilizes an additional capacitor ($C_1$) arranged in series with a controllable switch 242-b, where the switch 242-b and capacitor ($C_1$) are connected between the secondary windings 244-a, 244-b of the power supply 201, described in further detail below.

As seen in FIG. 2, the power system 200 comprises a power supply 201, the power supply 201 comprising a power conversion circuit 202, a controller 225, and output nodes 255-a and 255-b, where the output nodes 255 of the power supply 201 are configured to be coupled to input nodes 265-a and 265-b of a load circuit (e.g., shown as $C_{load}$). In some examples, the power conversion circuit 202 is configured to receive input power (e.g., DC input, AC input) and provide AC power to a primary winding 243 of a transformer of the power supply 201. In some embodiments, the primary winding 243 of the transformer is coupled to the power conversion circuit 202 using a first voltage/power rail 210 and a second voltage/power rail 211. The transformer of the power supply 201 further includes a plurality of secondary windings 244, such as a first secondary winding 244-a and a second secondary winding 244-b. Furthermore, a first rectifier circuit 214-a may be coupled to the first secondary winding 244-a and a second rectifier circuit 214-b may be coupled to the second secondary winding 244-b. In one non-limiting example, each of the first and second rectifier circuits 214 may comprise a full-bridge rectifier circuit.

As seen in FIG. 2, the power supply 201 further include a first diode (D1) and a second diode (D2). In this example, one end (e.g., cathode) of the first diode (D1) is connected to the rectifier circuit 214-a and the output node 255-a, while another end (e.g., anode) of the first diode (D1) is connected to the rectifier circuit 214-b. Additionally, one end (e.g., cathode) of the second diode (D2) is connected to the rectifier circuit 214-a, while another end (e.g., anode) of the second diode (D2) is connected to the rectifier circuit 214-b and the output node 255-b. Similar to FIGS. 1B and/or 1C, the power supply 201 may include a controllable switch 242-a (also referred to as a series switch) that is connected to the cathode of the second diode (D2) at one end and to the anode of the first diode (D1) at an opposing end. In some embodiments, the controller 225 of the power supply 201 is configured to receive an indication of one or more threshold(s) 280, such as, but not limited to, a first threshold voltage and a second threshold voltage. Additionally, the controller 225 may include a voltage monitoring circuit 228 (or comparator circuit 228) that is configured to calculate the output voltage ($V_{out}$) based on monitoring the voltage at each of nodes 255-a and 255-b. Furthermore, the controller 225 (or the monitoring circuit 228) compares the calculated output voltage ($V_{out}$) to one or more of the voltage threshold(s) 280 and outputs at least one control signal 271, based on the comparing.

As noted above, the power supply 201 may include the capacitor, $C_1$, and a second controllable switch 242-b connected in series with $C_1$. Here, one end of the capacitor $C_1$ is coupled to the secondary winding 244-a and rectifier circuit 214-a, while another end of the capacitor $C_1$ is coupled to a first end of the switch 242-b. Furthermore, the second end of the switch 242-b is coupled to the secondary winding 244-b and the rectifier circuit 214-b.

In some instances, and as shown in FIG. 2, the switch 242-a may be turned OFF (i.e., open) and the secondary windings 244-a, 244-b of the power supply 201 may be connected in parallel when the monitored output voltage is at or below a first threshold (e.g., 100V, 500V, etc.). Furthermore, when the monitored output voltage, $V_{out}$, exceeds the first threshold, the controller 225 outputs a first control signal 271-a to turn ON (or close) the series switch 242-a, which causes the secondary windings 244-a, 244-b to be connected in series. In some cases, the controller 225 can be configured to output a second control signal 271-b to turn ON (or close) the second switch 242-b, based on detecting that the monitored output voltage ($V_{out}$) exceeds a second threshold voltage. In some examples, the second threshold voltage may be greater than the first threshold voltage. Turning on the second switch 242-b causes the capacitor, $C_1$, to be switched into the power supply 201, which helps increase the range of output voltages over which the power supply 201 can provide the maximum output power (i.e., for charging the load capacitor $C_{load}$), as compared to the prior art. It should be noted that the series switch 242-a may remain in a closed position (i.e., turned ON) when the switch 242-b is turned ON to switch the capacitor $C_1$ into the power supply 201.

Figure 3A:
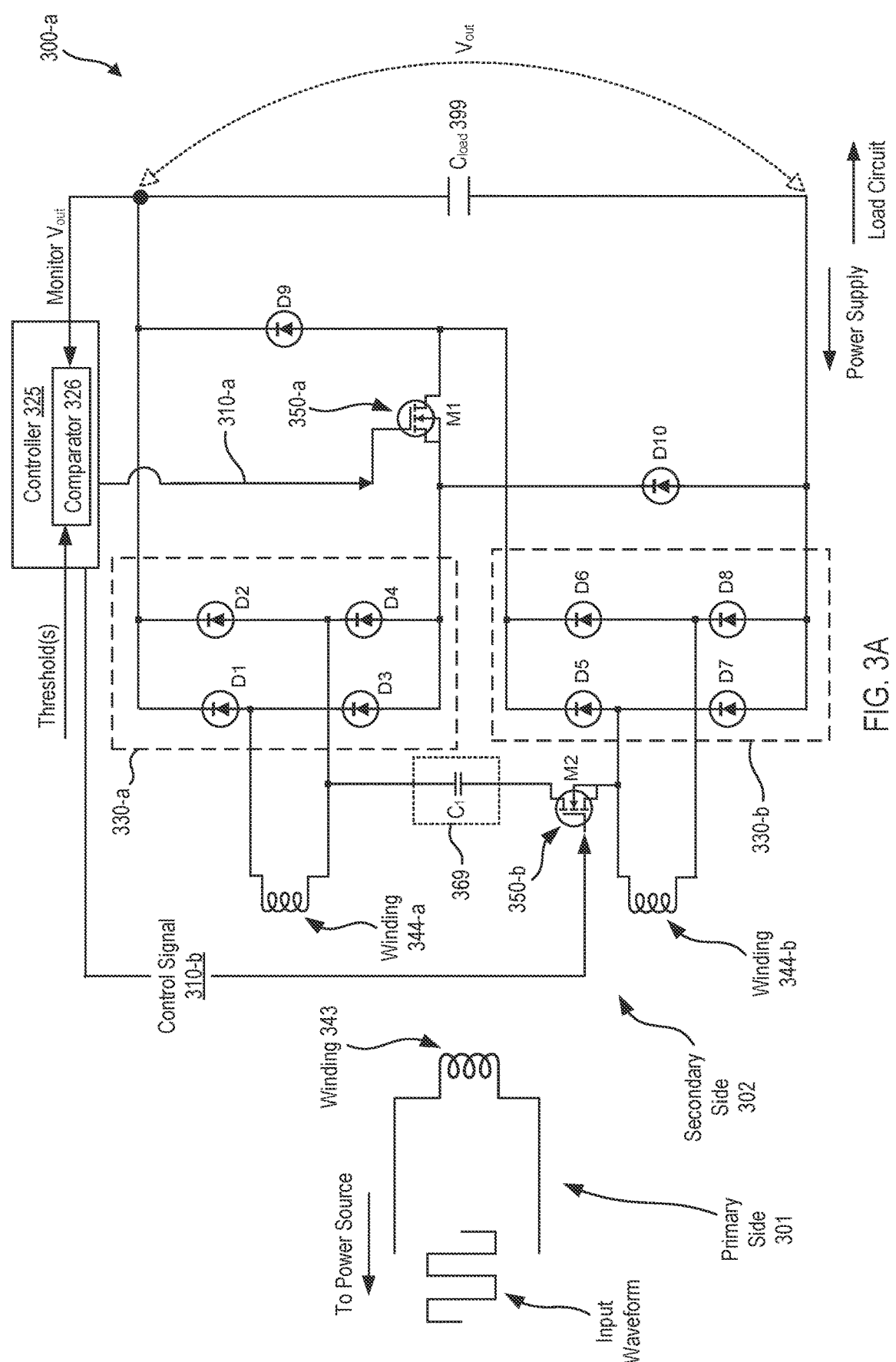
FIG. 3A illustrates a detailed schematic diagram of the power system in FIG. 2, according to various aspects of the present disclosure.

FIG. 3A illustrates a detailed schematic diagram 300-a of the power system in FIG. 2, according to various aspects of the present disclosure.

In some embodiments, the power system comprises a power supply (300-a), the power supply comprising a power conversion circuit (e.g., shown as power conversion circuit 202 in FIG. 2), a controller 325, and output nodes. In some instances, the power supply may comprise a capacitor charger and can be configured to charge a load capacitor ($C_{load}$) 399, where $C_{load}$ 399 can be coupled across the output nodes of the power supply, as shown in FIG. 3A. In some examples, the power supply (300-a) comprises a transformer having a primary side 301 and a secondary side 302, where the primary side 301 includes a primary winding 343 that is configured to receive AC power. The secondary side 302 of the transformer may include a plurality of secondary windings, including at least a first secondary winding 344-a and a second secondary winding 344-b. Furthermore, a first rectifier circuit 330-a may be coupled to the first secondary winding 344-a and a second rectifier circuit 330-b may be coupled to the second secondary winding 344-b. In this example, the first rectifier circuit 330-a comprises a full-bridge rectifier having diodes D1, D2, D3, and D4. Additionally, the second rectifier circuit 330-b also comprises a full-bridge rectifier having diodes D5, D6, D7, and D8.

As seen in FIG. 3A, the power supply (300-a) includes a first or upper diode (D9) and a second or lower diode (D10). In this example, one end (e.g., cathode) of the diode (D9) is connected to the rectifier circuit 330-a and one of the output nodes, while another end (e.g., anode) of the first diode (D9) is connected to the rectifier circuit 330-b. Additionally, one end (e.g., cathode) of the second diode (D10) is connected to the rectifier circuit 330-a, while another end (e.g., anode) of the second diode (D10) is connected to the rectifier circuit 330-b and another one of the output nodes of the power supply 300-a. Similar to FIG. 2, the power supply (300-a) may include a controllable switch 350-a that is connected to the cathode of the lower or second diode (D10) at one end and to the anode of the upper or first diode (DO) at an opposing end. In some embodiments, the controller 325 of the power supply 300-a is configured to receive an indication of one or more threshold(s), such as, but not limited to, a first threshold voltage and a second threshold voltage. Additionally, the controller 325 may include a comparator 326 (or monitoring circuit 326) that is configured to monitor the output voltage ($V_{out}$) across $C_{load}$ 399. Furthermore, the controller 325 (or the comparator 326) compares the output voltage ($V_{out}$) to one or more of the voltage threshold(s) and outputs at least one control signal 310, based on the comparing.

The power supply (300-a) may include a capacitor 369 ($C_1$), and a second controllable switch 350-b connected in series with $C_1$. As seen in FIG. 3A, one end of the capacitor $C_1$ is coupled to the secondary winding 344-a and rectifier circuit 330-a, while another end of the capacitor $C_1$ is coupled to a first end of the switch 350-b. Furthermore, the second end of the switch 350-b can be coupled to the secondary winding 344-b and the rectifier circuit 330-b.

In some instances, the switches 350-a and 350-b may be turned OFF (i.e., open) and the secondary windings 344-a, 344-b of the power supply may be connected in parallel when the monitored output voltage is at or below a first threshold (e.g., 500 V). Furthermore, when the monitored output voltage, $V_{out}$, exceeds the first voltage threshold, the controller outputs a first control signal 310-a to turn ON (or close) the series switch 350-a, which causes the secondary windings 344-a, 344-b to be connected in series. In some cases, the controller 325 can be configured to output a second control signal 310-b to turn ON (or close) the second switch 350-b, based on detecting that the monitored output voltage ($V_{out}$) exceeds a second threshold voltage. In some examples, the second threshold voltage may be greater than the first threshold voltage. It should be noted that the series switch 350-a may remain in a closed position (i.e., turned ON) when the switch 350-b is turned ON to switch the capacitor $C_1$ into the power supply (300-a). Additionally, the doubler switch M2 (i.e., switch 350-b) can remain in an open position (turned OFF) when the switch 350-a is initially turned ON, for instance, when $V_{out}$ is above the first threshold voltage but lower than the second threshold voltage.

In this way, the controller 325 can output the first control signal 310-a to open/close the first switch 350-a based on comparing the monitored output voltage ($V_{out}$) to the first threshold and output the second control signal 310-b to open/close the switch 350-b based on comparing the output voltage ($V_{out}$) to the second threshold, where the second threshold is greater than the first threshold. In one non-limiting example, the controller 325 may use the control signal 310-a to close (i.e., turn ON) the switch 350-a when $V_{out}$>500 V. Additionally, or alternatively, the controller 325 may use the control signal 310-b to close the switch 350-b when $V_{out}$>1000 V. It should be noted that other voltage thresholds besides those listed herein are contemplated in different embodiments, and the examples listed herein are not intended to be limiting. In some aspects, closing the switch 350-b causes the capacitor 369 (i.e., $C_1$) to be switched into the power supply (300-a), which allows the power supply to charge the load capacitor ($C_{load}$ 399) to a voltage level that is at least 1.5 to 2 times the second voltage threshold and using an output power that is at or near the full/maximum output power. Specifically, but without limitation, the switching of the capacitor 369 into the power supply allows the capacitor $C_{load}$ 399 to be charged using the full/maximum output power for a wider range of voltages, as compared to the prior art.

Furthermore, such a design incorporating the use of at least two different voltage thresholds, where the closing of a first switch at a first lower voltage threshold helps reconfigure the secondary windings from a parallel to a series arrangement and the closing of a second switch at a second higher voltage threshold to switch a capacitor into a power supply serves as a voltage doubler/multiplier, enables $C_{load}$ 399 to be charged at the full or maximum output power for a wider range of voltages (e.g., 250 V to 2 kV as compared to 250 V to 1 kV) with minimal changes to the transformer windings, switch 350-a, and/or diode(s) D1 through D10. In some examples, one or more of the diode(s) D1 through D10 may be swapped with diodes having a higher voltage rating (e.g., 3 kV instead of 2 kV). In some embodiments, the series switch 350-a (or M1) may be identical or substantially identical to the doubler switch 350-b (or M2). In other cases, the series switch 350-a may have a lower voltage rating than the doubler switch 350-b. Generally, the doubler switch 350-b may be designed to have a voltage rating that is at or above the voltage rating of the switch 350-a (or M1), the maximum output voltage (e.g., 2 kV), and/or a multiple of the maximum output voltage (e.g., at least 1.5 times the maximum output voltage, at least 2 times the maximum output voltage, etc.).

Figure 3B:
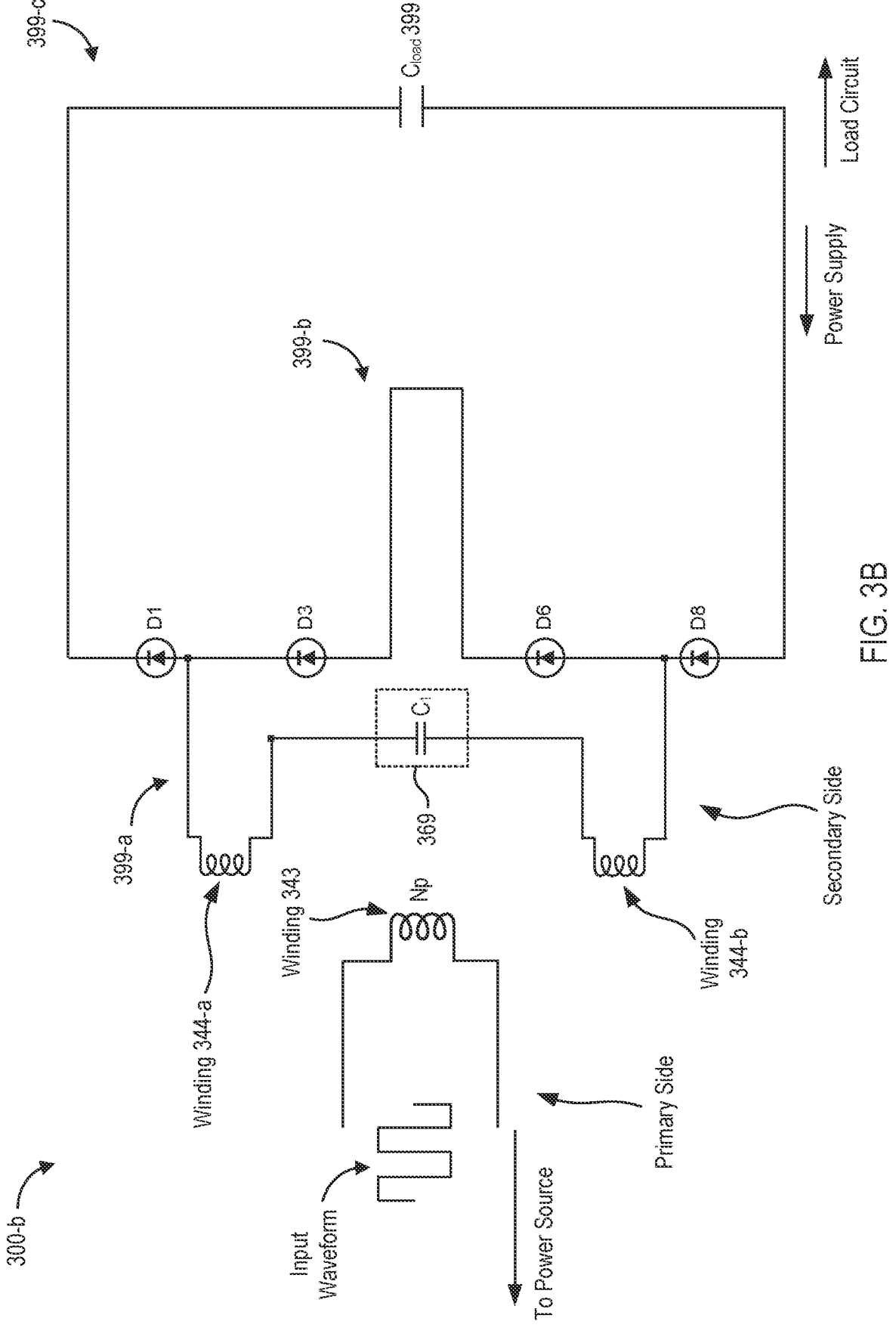
FIG. 3B depicts an equivalent output stage of the power system(s) in FIGS. 2 and/or 3A, and when the capacitor is switched into the power supply, according to various aspects of the present disclosure.

FIG. 3B depicts an equivalent output stage 300-b of the power system(s) in FIGS. 2 and/or 3A, and when the capacitor ($C_1$) is switched into the power supply, according to various aspects of the present disclosure.

Specifically, but without limitation, the schematic shown in FIG. 3B illustrates an equivalent output of the power system 300-a in FIG. 3A when both the switches M1, M2 are turned ON (or closed). As seen, when both the switches M1, M2 are closed, only a portion of the diodes (e.g., D1, D3, D6, and D8) conduct current. Said another way, one or more of the diodes (i.e., D2, D4, D5, D7, D9, and D10) do not conduct current when the switches M1, M2 are closed. In such cases, the secondary windings 344-a, 344-b and capacitor 369 of the power supply are connected in series. Additionally, the diodes D3, D6 are connected in series, and the diodes D1 and D8 and $C_{load}$ 399 are connected in series. Thus, the series block 399-a (i.e., comprising secondary winding 344-a, secondary winding 344-b, and capacitor 369 or $C_1$ arranged in series), series block 399-b (i.e., comprising diodes D3 and D6 in series), and series block 399-c (i.e., comprising diodes D1, D8, and $C_{load}$ 399 in series) are connected in parallel, as shown in FIG. 3B.

As noted above, connecting the secondary windings 344-a and 344-b in series serves to increase the turns ratio of the transformer, which in turn serves to increase the output voltage capability of the power supply (i.e., as compared to when the secondary windings are connected in parallel). Additionally, switching the capacitor 369 ($C_1$) into the power supply when $V_{out}$ reaches the second voltage threshold causes the capacitor 369 to charge to a voltage level that is around half the maximum output voltage (e.g., second voltage threshold). In such cases, as $V_{out}$ increases, the capacitor $C_1$ provides around half of the maximum output voltage, while the remainder of the output voltage is provided by the transformer. Furthermore, since the series blocks 399-a, 399-b, and 399-c are connected in parallel, the voltage across $C_{load}$ 399 equals the sum of the voltage across the capacitor 369 and the secondary windings 344-a, 344-b. In one non-limiting example, if the first and second voltage thresholds are around 500V and 1 kV, respectively, the disclosed power supply may be able to supply full or maximum output power until $V_{out}$ is at or around 2 kV.

Figure 4:
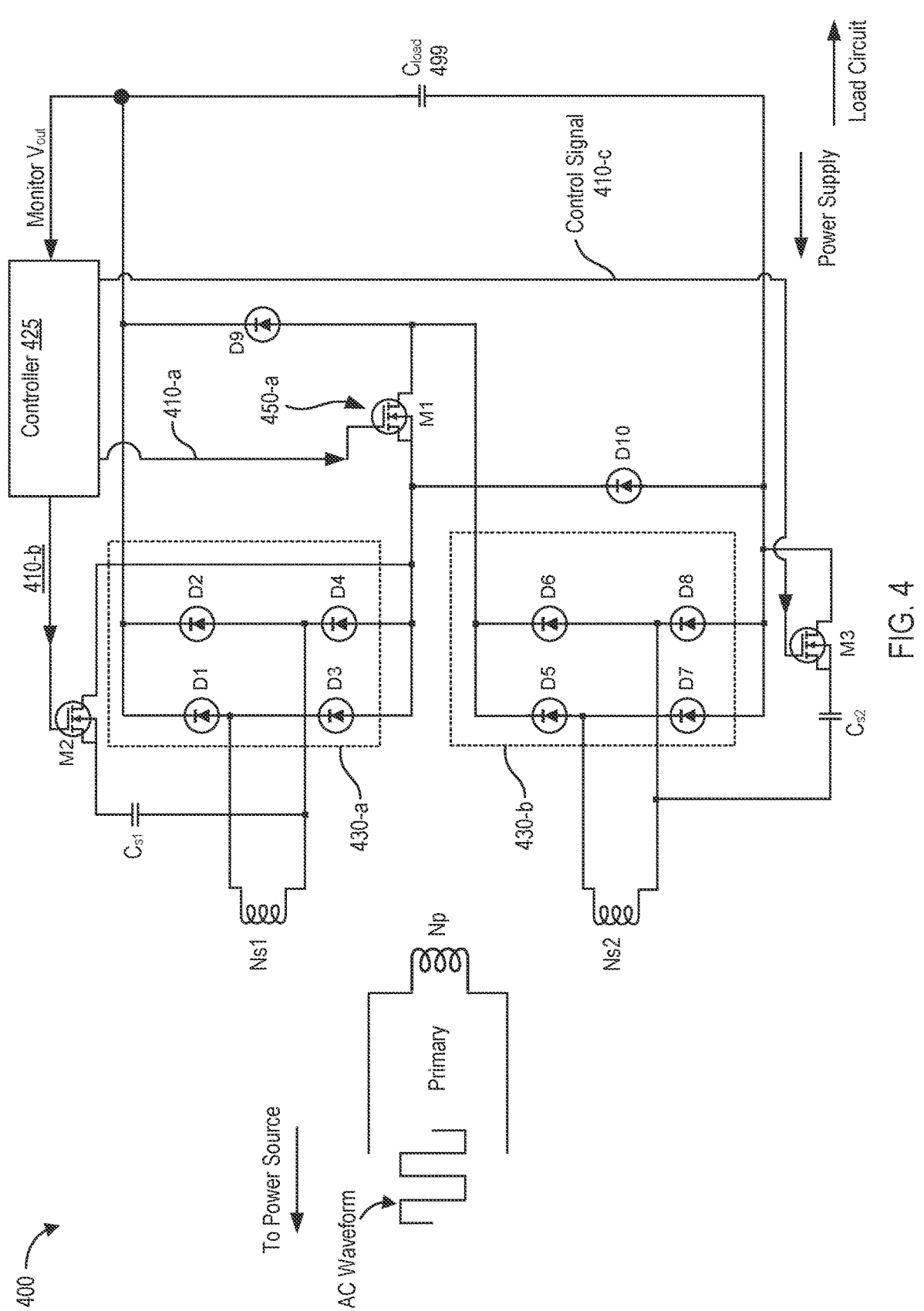
FIG. 4 illustrates another example of a power system that can be configured for charging a load capacitor, where the power system includes a plurality of secondary windings and a plurality of capacitors that can be switched in/out of the power supply, based on monitoring the output voltage, according to various aspects of the present disclosure.

FIG. 4 illustrates another example of a power system 400 that can be configured for charging a load capacitor, where the power system includes a plurality of secondary windings and a plurality of capacitors that can be switched in/out of the power supply, based on monitoring the output voltage ($V_{out}$), according to various aspects of the present disclosure. In some examples, the power system 400 may implement one or more aspects of the power system(s) described herein, including at least the power systems described in relation to FIGS. 1A, 3A, and/or 3B.

In some embodiments, each of the secondary windings (e.g., Ns1, Ns2) and rectifier circuits 430 (e.g., rectifier circuits 430-a, 430-b) may be coupled to a different switch-capacitor circuit. For example, as shown in FIG. 4, the secondary winding Ns1 and rectifier circuit 430-a can be coupled to the switch-capacitor circuit comprising switch M2 and capacitor $C_{s1}$ coupled in series, while the secondary winding Ns2 and rectifier circuit 430-b can be coupled to the switch-capacitor circuit comprising switch M3 and capacitor $C_{s2}$ coupled in series. Furthermore, the controller 425 can be configured to individually control the switches M2 and M3 using control signals 410-b and 410-c, respectively. Similar to FIGS. 1B-3A, the controller 425 can also be used to control the series switch 450-a (or M1) using control signal 410-a.

In some embodiments, the controller 425 may output a control signal (e.g., control signal 410-a; control signal(s) 410-b and/or 410-c) based on monitoring the output voltage ($V_{out}$) and comparing the monitored $V_{out}$ to at least one voltage threshold. For example, the controller 425 may output the control signal 410-a to close the switch M1 upon detecting that the monitored $V_{out}$ across $C_{load}$ 499 exceeds a first threshold (e.g., 100V, 500V, etc.), which causes the secondary windings (Ns1, Ns2) to be coupled in series, instead of in parallel when the switch M1 was open. Additionally, when the controller 425 (or alternatively, a monitoring circuit or comparator within the controller 425) detects that the monitored $V_{out}$ exceeds a second threshold (e.g., 200V, 1000V, etc.), the control signal(s) 410-b and/or 410-c may be used to close the switches M2 and M3, which enables the capacitors $C_{s1}$ and/or $C_{s2}$ to be switched into the power supply 400. In some embodiments, the capacitors Cs1 and Cs2 may have the same or substantially the same capacitance value (e.g., anywhere between 1 μF to 10 μF), which can aid in balancing, providing a substantially symmetrical topology, or a combination thereof. Furthermore, the controller 425 may be configured to transmit the control signals 410-b and 410-c at the same or substantially the same time, which allows the respective capacitors to also be switched into the power supply 400 at the same or substantially the same time. Any number of synchronization techniques known and/or contemplated in the art for controlling the switches M2, M3 can be utilized and may involve the use of a reference timing source, shared or common clock, and/or a GPS timing source, to name a few non-limiting examples.

In some aspects, the use of two capacitors (i.e., Cs1, Cs2) and two switches (i.e., M2, M3) for switching the capacitors into the power supply may provide the same or similar functionality as the embodiment where a single capacitor and single switch is employed, such as in FIGS. 2-3B. As can be appreciated by one of skill in the art, there is a tradeoff between the two alternatives, i.e., when a single capacitor and switch in series is connected between the two secondary windings as in FIG. 2, or when a capacitor and switch pair is connected to each of the secondary windings as in FIG. 4. For example, in some circumstances, the topology shown in FIG. 4 may allow the use of lower voltage rated switches and capacitors (i.e., as compared to the topology shown in FIGS. 2-3B), which may be more cost effective and easier to source as compared to devices (i.e., switches, capacitors) rated for higher voltages. On the other hand, the use of fewer components in the topology/architecture in FIG. 2 may lend to one or more of a more compact form factor, lower costs, and/or lower complexity (i.e., as compared to the topology shown in FIG. 4). Thus, aspects of the present disclosure provide designers with different alternatives for optimizing the charging profile of a load capacitor (or another applicable energy storage device) based on the use case, requirements, customer or user preferences, and/or any other relevant factors.

Figures 5A, 5B:
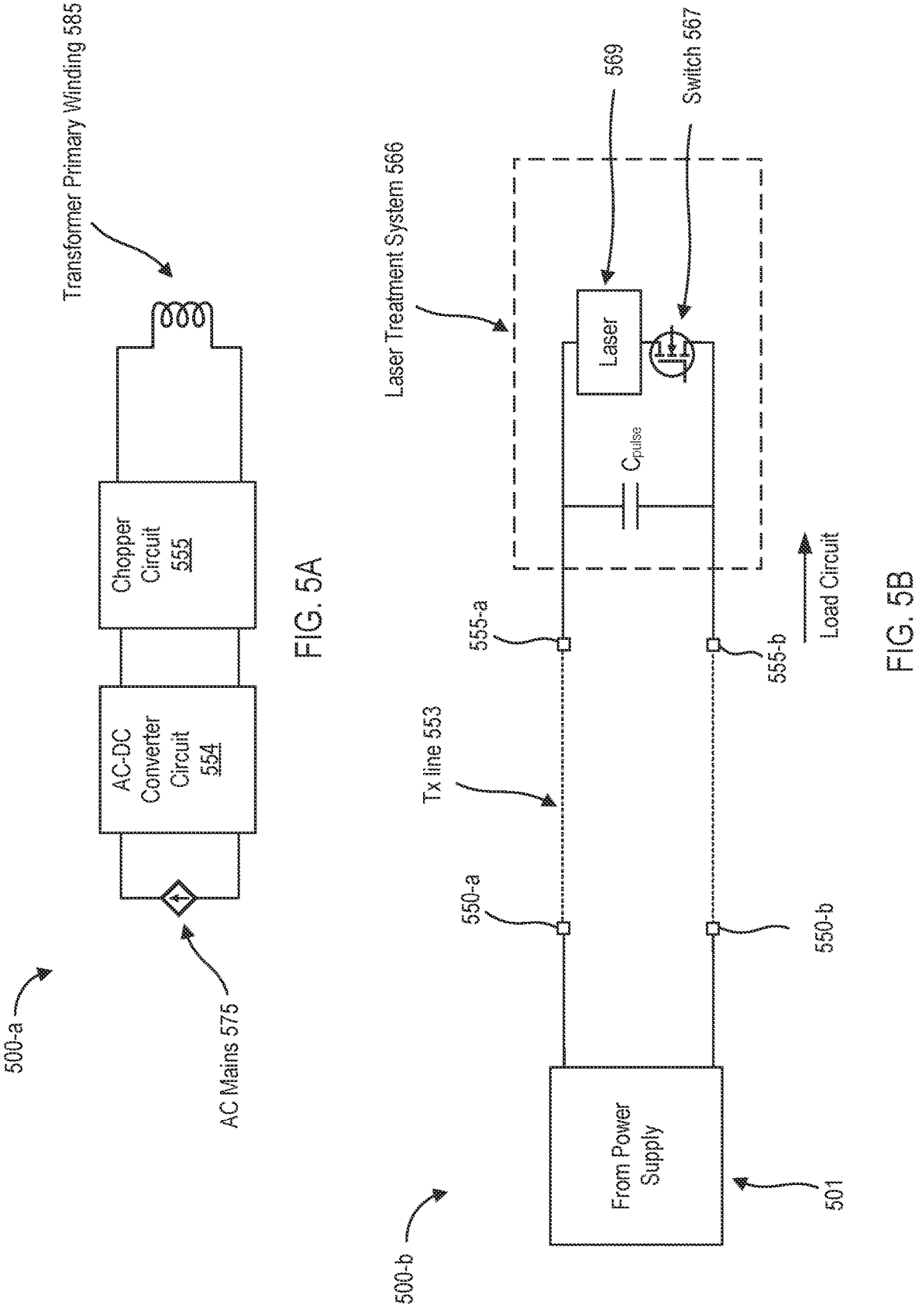
FIG. 5A illustrates an example of a primary or input side of a power supply, such as the power supplies shown in FIGS. 1A-4, according to various aspects of the present disclosure.
FIG. 5B illustrates an example of a secondary or output side of a power supply, such as the power supplies shown in FIGS. 1-4, according to various aspects of the present disclosure.

FIG. 5A illustrates an example of a primary or input side 500-a of a power supply, where the power supply may be similar or substantially similar to any of the power supplies described herein, including at least the power supplies shown and described in relation to FIGS. 1A-4, according to various aspects of the present disclosure. As seen, the primary side 500-a of the power supply (e.g., power supply 201, power supply 300-a) may be configured to be coupled to an input power source, such as an alternating current (AC) power source. In this example, the power supply is configured to connect to, and receive power from, the AC mains 575. The primary side 500-a of the power supply can further include an AC-DC converter circuit 554 that is configured to convert the input AC waveform into a DC waveform. In some embodiments, the power supply can further include a chopper circuit 555, where the chopper circuit 555 is coupled between the AC-DC converter circuit 554 and the primary winding 585 of the transformer. The chopper circuit 555 is configured to chop the input DC waveform and convert it to an AC waveform, where the AC waveform is supplied to the primary winding 585 of the transformer. It should be noted that, the AC waveform supplied to the transformer primary winding 585 may have different attributes as compared to the AC waveform supplied by the AC mains 575. For example, the AC waveform supplied to the primary winding 585 may have a different shape (e.g., square wave instead of a sine wave), a different frequency (e.g., 50,000 Hz, 500,000 Hz, etc., compared to 50-60 Hz provided by the AC mains 575), and/or a different amplitude, to name a few non-limiting examples.

FIG. 5B illustrates an example of a secondary side 500-b of a power supply, where the power supply may be similar or substantially similar to any of the power supplies described herein, including at least the power supplies shown and described in relation to FIGS. 1A-4, according to various aspects of the present disclosure.

For sake of illustration, a detailed view of the secondary windings (e.g., windings 344-a, 344-b in FIG. 3), rectifier circuits (e.g., rectifier circuits 330-a, 330-b), switches (e.g., switches 350-a, 350-b), and the switched-in capacitor (e.g., capacitor 369) is not shown. Instead, FIG. 5B is meant to depict the connection at the output end of the power supply, for instance, the connection between the power supply 501 and an exemplary load circuit. As seen, the power supply 501 comprises a plurality of output nodes 550-a and 550-b, where each of the output nodes 550 is configured to connect to an input node 555 of the load circuit via the transmission (Tx) line 553. For example, the Tx line 553 is used to connect the output node 550-a of the power supply 501 to the input node 555-a of the load circuit, and connect the output node 550-b to the input node 555-b.

In this example, the load circuit comprises a laser treatment system 566, where the laser treatment system 566 comprises or is coupled to a load capacitor (e.g., $C_{pulse}$). Specifically, but without limitation, the $C_{pulse}$ capacitor is coupled across the input nodes 555-a, 555-b, while the laser 569 and switch 567 are arranged in series and connected in parallel to $C_{pulse}$. In other words, the laser-switch series combination comprising laser 569 and the switch 567 are coupled to the $C_{pulse}$ capacitor in a parallel arrangement. It should be noted that more than one load capacitor can be charged using the disclosed power system, and the illustration of a single load capacitor in FIG. 5B is not intended to be limiting. For instance, multiple capacitors can be coupled in parallel across the nodes 555-a and 555-b, in which case the total load capacitance is a sum of the individual capacitances of the load capacitors. In either case, the load capacitors, including at least $C_{pulse}$, are connected in parallel across a circuit comprising a laser diode (or a laser 569) arranged in series with a semiconductor switch 567 (e.g., MOSFET, IGBT, or another applicable semiconductor switch).

In some embodiments, the power supply can be a capacitor charger configured to charge the $C_{pulse}$ capacitor (or another load capacitor) in the laser treatment system 566, or any other applicable system. In some cases, the opening/closing of the switch 567 can be controlled using an external controller (not shown). Closing the switch 567 causes the capacitor $C_{pulse}$ to discharge the stored energy into the laser 569, which enables the laser 569 to generate a short-burst of a high-energy pulse that can be directed to a target area (e.g., for hair removal, tattoo removal, or another applicable target area of a patient's body). As can be appreciated, a faster and/or more consistent charging time of the load capacitor, $C_{pulse}$, can serve to enhance user experience. Additionally, a higher charging voltage, a more consistent charging profile over a larger range of voltages, etc., can also serve to optimize user experience by reducing the downtime or charging time after each discharge cycle, enhance safety for both the patient and the doctor (or other professional) administering the medical procedure, and/or reduce the time required to complete the procedure, which can aid in reducing patient discomfort, overall cost of the medical procedure, etc.

While generally described in relation to a laser treatment system, the disclosed power system(s) can be employed for use with other systems besides the ones described herein. That is, the use of a laser treatment system (e.g., laser treatment system 566) at the output of the power supply is not intended to limit the scope and/or spirit of the present disclosure. Some non-limiting examples of load systems that can be utilized with the disclosed power system(s) can also include flashlamp systems, surgical laser treatment systems, battery charging systems, etc.

Figure 6B:
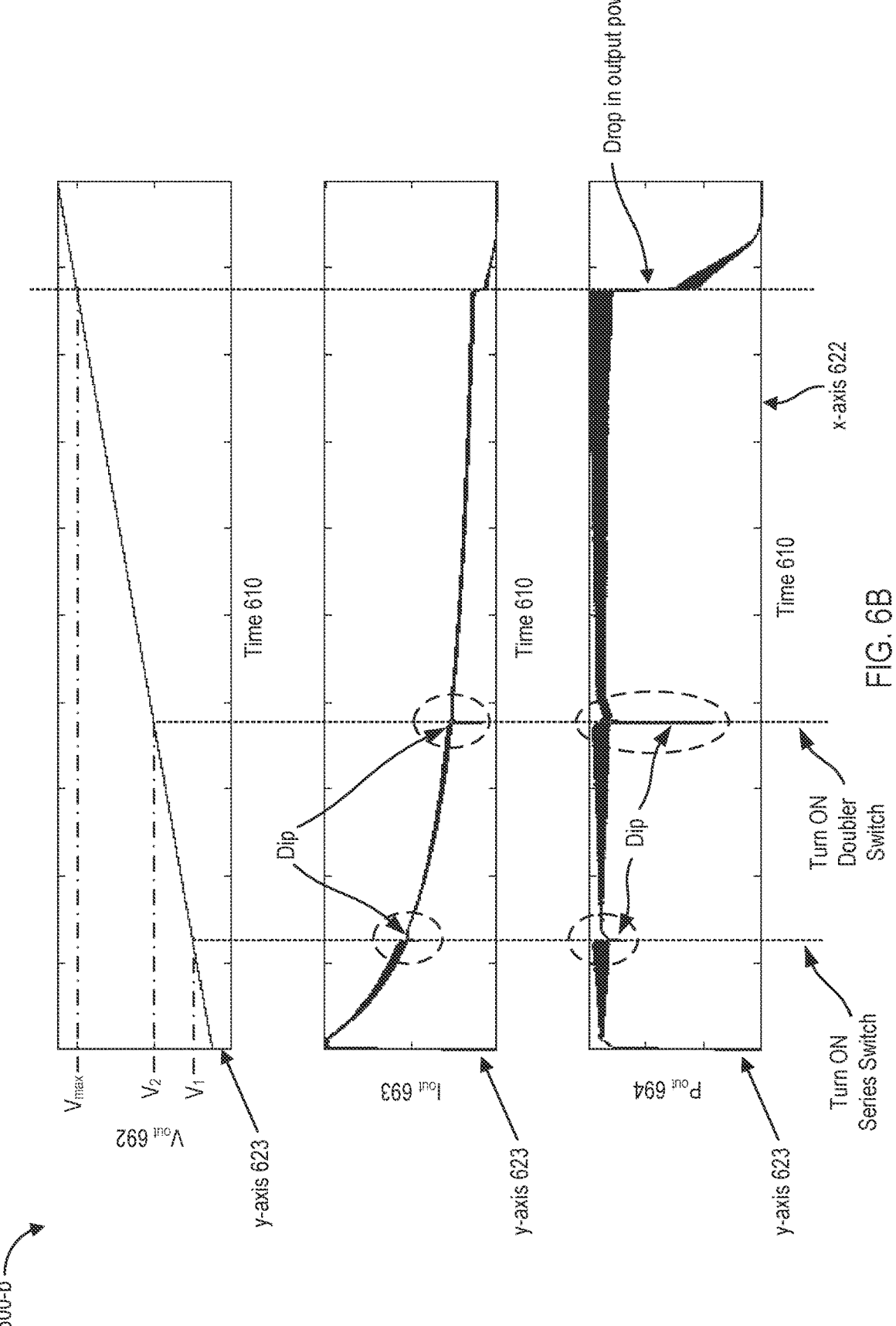
FIG. 6B illustrates conceptual graphs showing a charging profile for a load capacitor charged using a power supply or capacitor charger of the present disclosure.

Turning now to FIG. 6B, which illustrates a conceptual graph 600-b showing various waveforms associated with a charging profile for a power system, according to various aspects of the present disclosure. Specifically, but without limitation, conceptual graph 600-*b* shows the output voltage ($V_{out}$) 692, output current ($I_{out}$) 693, and output power ($P_{out}$) 694 on y-axis 623 and time 610 on x-axis 622 for a power system, such as power system(s) 200, 300-*a*, 300-*b*, and/or 400 described with reference to FIGS. 2, 3A, 3B, and/or 4, respectively.

As compared to the conceptual graph 600-*a* described with reference to FIG. 6A, graph 600-*b* depicts the charging profile for a power system that utilizes both a series switch (e.g., switch 242-*a* in FIG. 2) and a doubler switch (e.g., switch 242-*b* in FIG. 2), where the series switch and doubler switch are closed/turned ON at different voltage thresholds. In contrast, the graph 600-*a* depicts an example charging profile for a prior art power system that only utilizes a single series switch (e.g., switch 116 in FIG. 1B, switch 181 in FIG. 1C). In accordance with aspects of the present disclosure, the use of one or more additional switches (i.e., in addition to the series switch) and at least one capacitive element can further extend the operating voltage range of the power supply (e.g., capacitor charger), as compared to the prior art. In some aspects, each of the additional switches (e.g., switch 350-*b* in FIG. 3A; switches M2 and M3 in FIG. 4) can be used to switch in (i.e., connect) a respective capacitor into the power supply. In some cases, each of the additional switches can be arranged in series with a capacitor that can be switched in or out of the power supply based on comparing the monitored output voltage to at least one voltage threshold.

As shown in FIG. 6B, the series switch can be turned ON (or closed) when $V_{out}$ reaches a first threshold (e.g., $V_1$). This causes the secondary windings of the transformer to be connected in series (instead of in parallel), which effectively increases the turns ratio of the transformer and helps provide a substantially constant output power ($P_{out}$) until the output voltage reaches the second threshold (e.g., $V_2$). In some examples, this second threshold voltage, $V_2$, may be equal or substantially equal to the maximum voltage, $V_2$, depicted in FIG. 6A. In accordance with aspects of the present disclosure, the one or more additional switches (or doubler switches) can be turned ON when the detected output voltage reaches the second threshold, $V_2$, which facilitates switching in one or more capacitors into the power supply. As seen in FIG. 6B, there may be a temporary dip in the output current and/or output power when the doubler switch is turned ON, which can be due to the charging of the switched-in capacitor (e.g., capacitor 369 or $C_1$ in FIGS. 3A-B). In some cases, the depth and/or length of this dip in output power and/or output current may be dependent on the value of the capacitance being switched in. For example, a capacitor having a larger capacitance value can result in a longer and/or deeper dip in output power/current as compared to a capacitor having a smaller capacitance value.

As seen in FIG. 6B, turning ON the doubler switch helps extend the charge profile of the power supply, i.e., as compared to the charge profile seen in FIG. 6A. Specifically, the use of the doubler switch in addition to the series switch allows the power supply to supply a constant or substantially constant output power for a larger range of voltages (e.g., from 250V to 2 kV) than the one (e.g., from 250V to 1 kV) provided by the prior art power supply. In one non-limiting example, the maximum charging voltage, Vmax, achievable by the disclosed power system may be at least 1.5 to 2 times the maximum charging volage, $V_2$, achievable by the prior art power system.

In some aspects, the increase in maximum charging voltage can be due to the switched-in capacitor and transformer working in tandem, which helps boost the maximum voltage that can be provided by the transformer alone. For example, as the output voltage increases, the voltage across the switched-in capacitor can be kept to a level that is at or around half the output voltage. In such cases, the transformer can be used to provide the remainder of the output voltage. In one non-limiting example, if the output voltage, $V_{out}$, is around 2 kV, the switched-in capacitor can provide around 1 kV, and the remaining 1 kV can be provided by the transformer. Contrastingly, without the switched-in capacitor and doubler switch, the power supply may only be capable of providing a maximum output voltage of ~1 kV before there is a steep drop in output power.

In this way, aspects of the present disclosure can assist in optimizing the charge profile for a power system, such as a capacitor charger, by using a switched-in capacitor in conjunction with the transformer to provide the maximum output power for a larger range of output voltages, as compared to the prior art.

Figure 7:
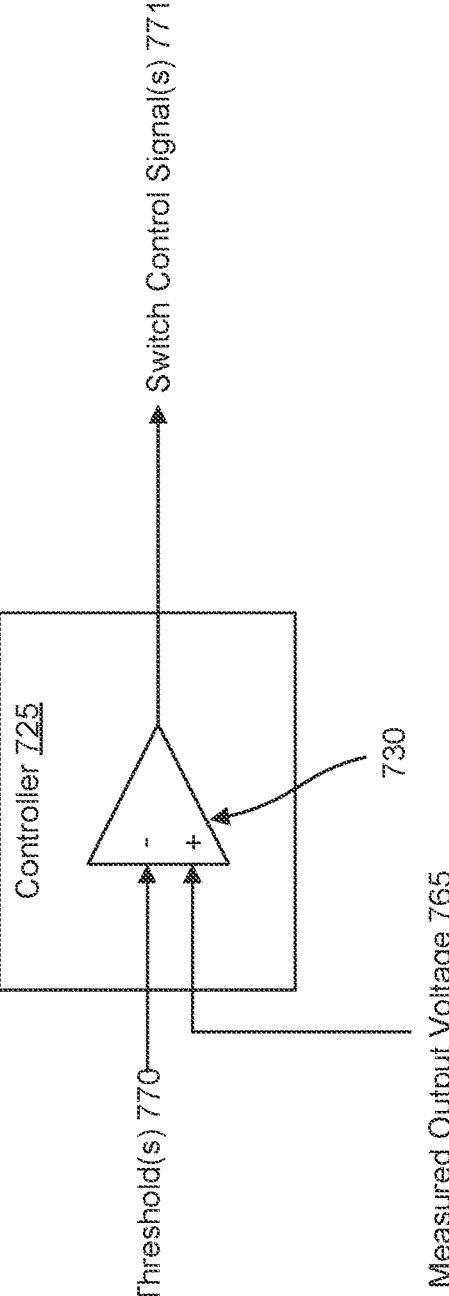
FIG. 7 illustrates an example of a controller comprising a comparator, where the controller can be utilized with any of the power supplies described with reference to FIGS. 1A through 5B, according to various aspects of the disclosure.

FIG. 7 illustrates an example (700) of a controller 725 comprising a comparator 730, where the controller 725 can be implemented in any of the power supplies described with reference to FIGS. 1A through 4, according to various aspects of the disclosure. As seen, the comparator 730 is configured to receive an indication of at least one threshold 770 at one of its input terminals. Furthermore, the comparator 730 is configured to receive an indication of a measured/monitored output voltage 765 of the power supply at another one of its input terminals. In some cases, one or more of the threshold(s) 770 and the measured output voltage 765 may be received by an input component (e.g., input component 931 in FIG. 9) of a computing system (e.g., computing system 900), where the computing system 900 can be used to effectuate one or more aspects of the present disclosure, as described below. In some cases, one or more aspects of the controller 725 can be implemented using the computing system 900 in FIG. 9.

In some embodiments, the comparator 730 can compare the measured output voltage 765 to the at least one threshold 770 and determine if the measured $V_{out}$ exceeds the at least one threshold. As noted above, in some cases, the disclosed power system may compare the measured $V_{out}$ to at least two voltage thresholds, such as, a first voltage threshold and a second voltage threshold, where the second voltage threshold is greater than the first threshold. For example, if the measured $V_{out}$ is greater than the first voltage threshold, the controller 725 can transmit a first control signal 771 to turn ON the series switch, which helps connect the secondary windings of the power supply in series and thereby increase the output voltage capability of the power supply, i.e., as compared to when the secondary windings were connected in parallel. Additionally, when the measured $V_{out}$ exceeds the second voltage threshold, the controller 725 can transmit a second control signal to turn ON another switch (also referred to as a doubler switch) that helps switch in at least one capacitor into the power supply, which further enhances the output voltage capability of the power supply, i.e., as compared to when the secondary windings are connected from parallel to series.

FIG. 8 illustrates an example of a method 800 for operating a power supply, according to various aspects of the present disclosure. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, one or more operations of method 800 may be implemented in one or more processing devices (e.g., controllers 125, 225, 325, 425, and/or 725; a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium (e.g., non-transitory computer readable storage medium). The one or more processing devices may include one or more devices configured through hardware, firmware, and/or software to be specifically designed for execution of one or more of the operations of method 800.

A first operation 802 may comprise monitoring a voltage at an output end of the power supply.

A second operation 804 may comprise controlling, based on the voltage exceeding a first threshold, a first switch to connect a plurality of secondary windings of the power supply in series.

A third operation 806 may comprise controlling, based on the voltage exceeding a second threshold, at least one other switch to switch in at least one capacitor into the power supply, wherein the second threshold is greater than the first threshold.

Figure 9:
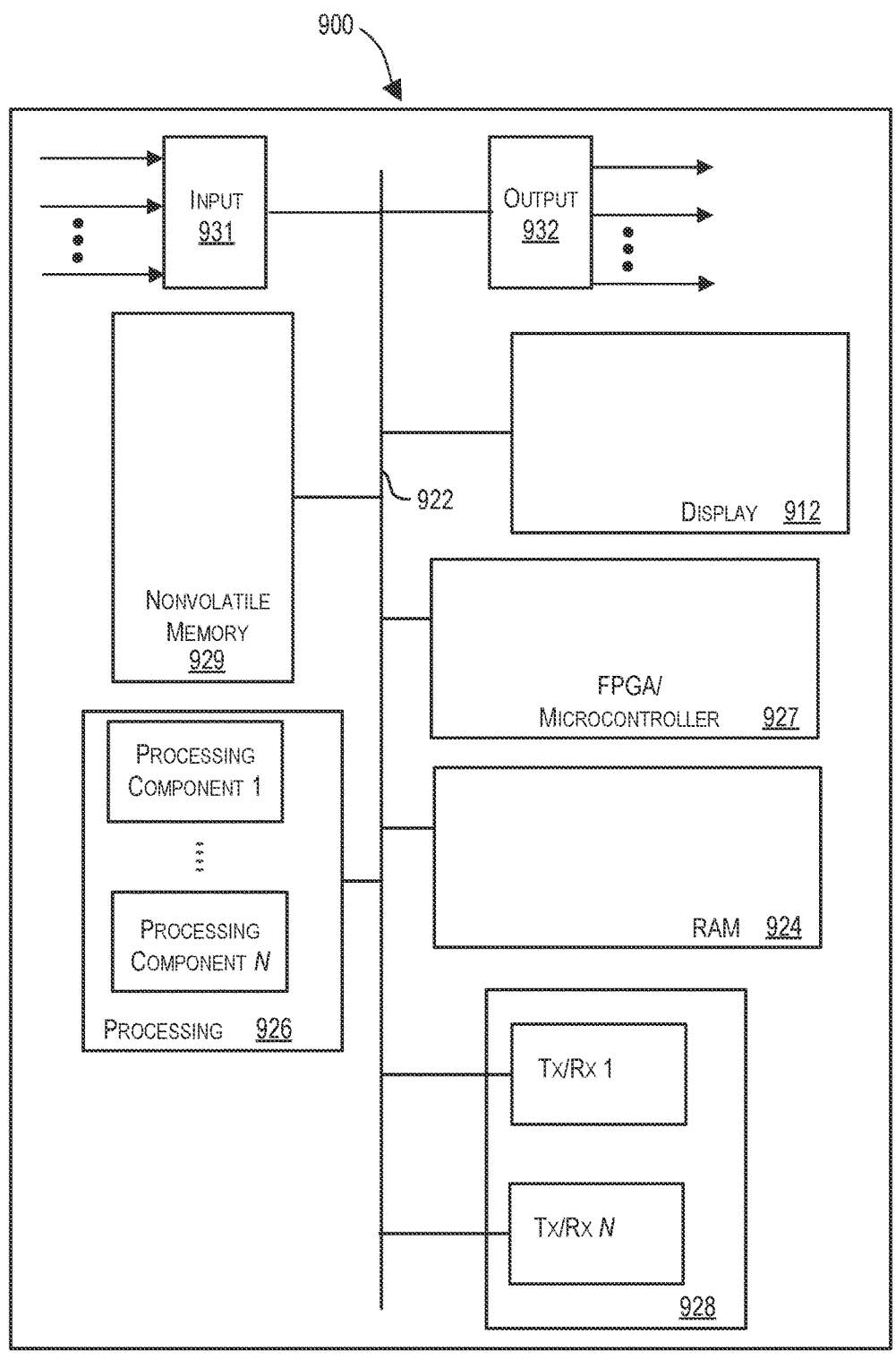
FIG. 9 illustrates a block diagram of a computer system that may be used to implement one or more aspects of the present disclosure.

FIG. 9 illustrates a block diagram of a computer system 900 that may be used to implement one or more aspects of the present disclosure, including at least a method (e.g., method 800) for operating a power supply, such as a capacitor charger. As shown, in this embodiment, a display 912 and nonvolatile memory 929 are coupled to a bus 922 that is also coupled to random access memory ("RAM") 924, a processing portion (which includes N processing components) 926, a field programmable gate array (FPGA) 927, and a transceiver component 928 that includes N transceivers. Although the components depicted in FIG. 9 represent physical components, FIG. 9 is not intended to be a detailed hardware diagram; thus, many of the components depicted in FIG. 9 may be realized by common constructs or distributed among additional physical components. Moreover, other existing and yet-to-be developed physical components and architectures may also be utilized to implement the functional components described with reference to FIG. 9.

A display 912 generally operates to provide a user interface for a user, and in several implementations, display 912 is realized by a touchscreen display. For example, display 912 can be used to control and interact with the components described herein. In other cases, a user may input one or more thresholds (e.g., a first voltage threshold, a second voltage threshold, a maximum or target output voltage, to name a few non-limiting examples) via the touchscreen display.

In general, nonvolatile memory 929 is non-transitory memory that functions to store (e.g., persistently store) data and machine readable (e.g., processor executable) code (including executable code that is associated with effectuating the methods described herein). In some embodiments, for example, nonvolatile memory 929 includes bootloader code, operating system code, file system code, and non-transitory processor-executable code to facilitate the execution of the methods described herein, such as method 800 in FIG. 8.

In some implementations, nonvolatile memory 929 may be realized by flash memory (e.g., NAND or ONENAND memory). In other examples, other memory types may be utilized as well. Although some examples may execute the code from the nonvolatile memory 929, in other examples, the executable code in the nonvolatile memory may typically be loaded into RAM 924 and executed by one or more of the N processing components in the processing portion 926.

In operation, the N processing components in connection with RAM 924 may generally operate to execute the instructions stored in nonvolatile memory 929 to realize the functionality of one or more of the controller (e.g., controller 125, controller 225, controller 325, controller 425), comparator (e.g., comparator 730), and/or monitoring circuit (e.g., monitoring circuit 228) described herein. For example, non-transitory processor-executable instructions to effectuate the methods described herein may be persistently stored in nonvolatile memory 929 and executed by the N processing components in connection with RAM 924. Processing portion 926 may include one or more of a general-purpose processor, microcontroller, microprocessor, embedded processor, application-specific integrated circuit (ASIC) processor, video processor, digital signal processor (DSP), graphics processing unit (GPU), and other applicable processing components.

In addition, or in other examples, the field programmable gate array (FPGA) 927 may be configured to effectuate one or more aspects of the methodologies described herein. For example, non-transitory FPGA-configuration-instructions may be persistently stored in nonvolatile memory 929 and accessed by the FPGA 927 (e.g., during boot up) to configure the FPGA 927.

The input component 931 may generally operate to receive signals (e.g., output voltage measurement, output current measurement, output power measurement, one or more voltage threshold(s), to name a few). The output component 932 may generally operate to provide one or more digital and/or analog signals (e.g., control signals to the one or more switches, such as a control signal to switch or connect a capacitor into the power supply) to effectuate operational aspects of a power system described herein. In some embodiments, the computer system 900 may be used in conjunction with the controller described herein for optimizing the charge profile for a load capacitor, as compared to the prior art.

The depicted transceiver component 928 includes N transceiver chains, which may be used for communicating with external devices (e.g., external controllers) via wireless or wireline networks. Each of the N transceiver chains may represent a transceiver associated with a particular communication scheme (e.g., Wi-Fi, Ethernet, Profibus, etc.).

Method 800 and/or other methods of this disclosure may include other steps or variations in various other embodiments. Some of the method(s) described herein, including at least method 800, may be performed by or embodied in hardware, and/or performed or executed by a controller, a CPU, an FPGA, a System on Chip (SoC), a Measurement and Control Multi-Processor System on Chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the methods.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

It will be understood that, although the terms first, second, third, etc., may be used herein to describe various elements, components, responses, categories, and/or sections, these elements, components, responses, categories, and/or sections should not be limited by these terms. These terms are only used to distinguish one element, component, response, category, or section from another element, component, response, category, or section. Thus, a first element, component, response, category, or section discussed herein could be termed a second element, component, response, category, or section without departing from the teachings of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups but do not preclude the presence or addition of one or more other features, integers, steps, operations, elements, components, and/or groups thereof. As used herein, the term "and/or" includes any and all combinations of one or more of the associated listed items and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, no intervening elements or layers may be present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

What is claimed is:

1. A method of operating a power supply comprising:
monitoring a voltage at an output end of the power supply;
controlling, based on the voltage exceeding a first threshold, a first switch to connect a plurality of secondary windings of the power supply in series; and
controlling, based on the voltage exceeding a second threshold, at least one other switch to switch in at least one capacitor into the power supply, wherein the second threshold is greater than the first threshold.

2. The method of claim 1, wherein the power supply comprises a transformer coupled between an input end and the output end of the power supply, the transformer comprising a single primary winding and the plurality of secondary windings.

3. The method of claim 1, wherein, when the voltage is at or below the first threshold,
the first switch is turned OFF; and
the plurality of secondary windings are connected in parallel.

4. The method of claim 1, wherein controlling the at least one other switch comprises:
turning ON a second switch to switch in a capacitor connected in series with the second switch into the power supply, and wherein the second switch and the capacitor are coupled between a first secondary winding and a second secondary winding of the plurality of windings.

5. The method of claim 1, wherein controlling the at least one other switch comprises:
turning ON a second switch connected to a first secondary winding of the plurality of secondary windings, and wherein turning ON the second switch switches in a first capacitor connected in series with the second switch into the power supply; and
turning ON a third switch connected to a second secondary winding of the plurality of secondary windings, and wherein turning ON the third switch switches in a second capacitor connected in series with the third switch into the power supply.

6. The method of claim 5, wherein the second switch and third switch are turned ON at a same or approximately the same time.

7. The method of claim 1, wherein:
the second threshold is twice the first threshold.

8. The method of claim 7, wherein controlling the first switch and the at least one other switch enables the power supply to supply a constant or substantially constant output power when the voltage is in a range from 0V to at least twice the second threshold.

9. The method of claim 1, wherein controlling the first switch and the at least one other switch enables the power supply to supply, for a range of voltages, a constant or substantially constant output power to a load connected at the output end of the power supply, and wherein a lower end of the range is below the first threshold and an upper end of the range is greater than the second threshold.

10. A power supply comprising:
a transformer circuit connected between an input end and an output end of the power supply, wherein the transformer circuit comprises:
a primary winding;
a plurality of secondary windings, including at least a first secondary winding and a second secondary winding;
a first switch;
at least one other switch, each of the at least one other switch connected in series with a capacitor; and
a monitoring circuit, wherein the monitoring circuit is configured to:
monitor a voltage at an output end of the power supply;
control, based on the voltage exceeding a first threshold, the first switch to connect at least the first and the second secondary windings in series; and
control, based on the voltage exceeding a second threshold, the at least one other switch to switch in a respective capacitor into the power supply, wherein the second threshold is greater than the first threshold.

11. The power supply of claim 10, wherein the plurality of secondary windings, including at least the first secondary winding and the second secondary winding are connected in parallel when the voltage is at or below the first threshold.

12. The power supply of claim 10, wherein controlling the at least one other switch comprises:

controlling a second switch coupled between the first and the second secondary windings, and wherein controlling the second switch switches in a capacitor connected in series with the second switch into the power supply.

13. The power supply of claim 10, wherein controlling the at least one other switch comprises:

controlling a second switch connected to the first secondary winding to switch in a first capacitor connected in series with the second switch into the power supply; and controlling a third switch connected to the second secondary winding to switch in a second capacitor connected in series with the third switch into the power supply.

14. The power supply of claim 13, wherein the second switch and third switch are switched ON at a same or approximately the same time.

15. The power supply of claim 10, further comprising:

a first rectifier circuit connected to the first secondary winding; and a second rectifier circuit connected to the second secondary winding; and wherein the first switch is coupled between the first and the second rectifier circuits.

16. The power supply of claim 10, wherein:

the second threshold is at least twice the first threshold.

17. The power supply of claim 16, wherein controlling the first switch and the at least one other switch enables the power supply to supply a constant or substantially constant output power when the voltage is in a range from 0V to at least twice the second threshold.

18. The power supply of claim 10, wherein controlling the first switch and the at least one other switch enables the power supply to supply, for a range of voltages, a constant or substantially constant output power to a load connected at the output end of the power supply, and wherein a lower end of the range is below the first threshold and an upper end of the range is greater than the second threshold.

19. The power supply of claim 10, wherein the power supply is configured to receive, at the input end, input power from one of a direct current (DC) power source or an alternating current (AC) power source, and wherein the power supply is configured to supply AC power to the primary winding of the transformer circuit.

20. A non-transitory computer readable storage medium storing processor readable instructions that, when executed by a processor, cause the processor to perform a method for operating a power supply, the method comprising:

monitoring a voltage at an output end of the power supply;

controlling, based on the voltage exceeding a first threshold, a first switch to connect a plurality of secondary windings of the power supply in series; and controlling, based on the voltage exceeding a second threshold, at least one other switch to switch in at least one capacitor into the power supply, wherein the second threshold is greater than the first threshold.

* * * * *